US012782894B2

(12) United States Patent
Ridley et al.

(10) Patent No.: US 12,782,894 B2
(45) Date of Patent: Nov. 3, 2026

(54) METHOD AND SYSTEM FOR REAL-TIME INDUSTRIAL PROCESS GUIDANCE

(71) Applicant: AspenTech Corporation, Bedford, MA (US)

(72) Inventors: Kerry Clayton Ridley, Houston, TX (US); Michael R. Keenan, Houston, TX (US); Qingsheng Quinn Zheng, Sugar Land, TX (US); Yizhou Fang, Katy, TX (US); Samantha LaCombe, Houston, TX (US)

(73) Assignee: AspenTech Corporation, Bedford, MA (US)

( * ) Notice: Subject to any disclaimer, the term of this patent is extended or adjusted under 35 U.S.C. 154(b) by 392 days.

(21) Appl. No.: 18/505,638

(22) Filed: Nov. 9, 2023

(65) Prior Publication Data

US 2024/0160166 A1 May 16, 2024

Related U.S. Application Data

(60) Provisional application No. 63/383,142, filed on Nov. 10, 2022.

(51) Int. Cl.
*G05B 13/04* (2006.01)

(52) U.S. Cl.
CPC .................................. *G05B 13/048* (2013.01)

(58) Field of Classification Search
None
See application file for complete search history.

(56) References Cited

U.S. PATENT DOCUMENTS 6,056,781 A * 5/2000 Wassick ............... G05B 13/048 703/2
6,615,090 B1 * 9/2003 Blevins ............. G05B 23/0227 700/20
7,050,863 B2 * 5/2006 Mehta .................. G05B 13/048 700/19
7,376,472 B2 * 5/2008 Wojsznis ............ G05B 13/042 700/28

(Continued)

*Primary Examiner* — Jason Lin
(74) *Attorney, Agent, or Firm* — Hamilton, Brook, Smith & Reynolds, P.C.

(57) ABSTRACT

Embodiments generate real-time industrial process guidance. One such embodiment receives, in memory of a processor, an operator question relating to a user-specified process variable of a model predictive control (MPC) controller of an industrial process. Next, a real-time simulation is performed of operational scenario(s) of the industrial process using a steady-state optimization problem of the MPC controller to determine operational characteristics of the industrial process in each of the operational scenario(s). Performing the real-time simulation includes, for each operational scenario, modifying a constraint variable of the steady-state optimization problem and, using the modified constraint variable, determining an updated value of the user-specified process variable. The determined operational characteristics of the industrial process include the determined updated value of the user-specified process variable. In turn, based on the determined operational characteristics of the industrial process, a recommendation is generated and output responsive to the operator question.

20 Claims, 35 Drawing Sheets

(56) References Cited

U.S. PATENT DOCUMENTS

| | | | | | |
|---|---|---|---|---|---|
| 7,613,536 | B2 * | 11/2009 | Orzell | G06Q 10/087 | 705/28 |
| 7,949,417 | B2 * | 5/2011 | Peterson | G05B 13/048 | 700/36 |
| 9,563,185 | B2 * | 2/2017 | Sayyar-Rodsari | G05B 13/048 | |
| 9,727,035 | B2 * | 8/2017 | Keenan | G05B 13/04 | |
| 2004/0049299 | A1 * | 3/2004 | Wojsznis | G05B 13/042 | 700/28 |
| 2018/0032940 | A1 * | 2/2018 | Trenchard | G06Q 10/06393 | |
| 2021/0116891 | A1 * | 4/2021 | Zhao | G05B 13/048 | |

* cited by examiner

330

Independents

| Name | Description | Critical | Combined Status | Service Request | Loop Status | Operator Low Limit | Measurement | Steady State Value | Operator High Limit | Current Move |
|---|---|---|---|---|---|---|---|---|---|---|
| FIC-2001 | FIC-2001 | No | Lo Limit | On | On | 1.500 | 1.721 | 1.500 | 3.500 | -0.070 |
| FIC-2002 | FIC-2002 | No | Normal | On | On | 5.000 | 7.643 | 7.052 | 20.000 | -0.168 |
| TIC-2003 | TIC-2003 | No | Normal | On | On | 195.000 | 199.960 | 197.446 | 205.000 | -0.568 |
| FIC-2004 | FIC-2004 | No | Lo Limit | On | On | 5.000 | 7.181 | 5.000 | 13.000 | -0.222 |
| FI-2005 | FI-2005 | No | Normal | On | | | 5.000 | 5.000 | | |

331a 331b 331c 331d 331e 335 335b 336 337

Dependents

| Name | Description | Critical | Combined Status | Service Request | Operator Low Limit | Measurement | Steady State Value | Operator High Limit |
|---|---|---|---|---|---|---|---|---|
| AI-2020 | AI-2020 | No | Normal | On | 1.200 | 3.061 | 3.285 | 3.500 |
| AI-2021 | AI-2021 | No | Lo Limit | On | 2.500 | 2.502 | 2.500 | 3.500 |
| AI-2022 | AI-2022 | No | Hi Limit | On | 3.500 | 4.496 | 5.500 | 5.500 |

332a 332b 332c 333 333b 334 334b

FIG. 3B

770b

Independents (771)

| Name | Description | Critical | Combined Status | Service Request | Loop Status | Operator Low Limit (776) | Measurement | Steady State Value (775) | Operator High Limit | Current Move |
|---|---|---|---|---|---|---|---|---|---|---|
| FIC-2001 | FIC-2001 | No | Normal | On | On | 1.500 (777) | 1.721 | 1.502 (775b) | 3.500 | -0.126 |
| FIC-2002 | FIC-2002 | No | Normal | On | On | 5.000 | 7.643 | 6.779 | 20.000 | -0.197 |
| TIC-2003 | TIC-2003 | No | Normal | On | On | 195.000 | 199.960 | 198.274 | 205.000 | -0.369 |
| FIC-2004 | FIC-2004 | No | Lo Limit | On | On | 5.000 | 7.181 | 5.000 | 13.000 | -0.309 |
| FI-2005 | FI-2005 | No | Normal | On | | | 5.000 | 5.000 | | |

Dependents (772)

| Name | Description | Critical | Combined Status | Service Request | Operator Low Limit | Measurement | Steady State Value | Operator High Limit (774, 774b) |
|---|---|---|---|---|---|---|---|---|
| AI-2020 | AI-2020 | No | Hi Limit | On | 1.200 | 3.061 | 3.500 | 3.500 |
| AI-2021 | AI-2021 | No | Lo Limit | On | 2.500 | 2.502 | 2.500 | 3.500 |
| AI-2022 | AI-2022 | No | Hi Limit | On | 3.500 | 4.496 | 5.168 | 5.168 |

FIG. 7B

880

Independents (885)

| Name | Description | Critical | Combined Status | Service Request | Loop Status | Operator Low Limit | Measurement | Steady State Value | Operator High Limit | Current Move |
|---|---|---|---|---|---|---|---|---|---|---|
| FIC-2001 (881a) | FIC-2001 | No | Lo Limit | On | On | 1.500 | 1.721 | 1.500 (885a) | 3.500 | 0.099 |
| FIC-2002 | FIC-2002 | No | Normal | On | On | 5.000 | 7.643 | 7.860 | 20.000 | -0.079 |
| TIC-2003 (881c) | TIC-2003 | No | Lo Limit | On | On | 195.000 | 199.960 | 195.000 (885c) | 205.000 | -1.000 |
| FIC-2004 | FIC-2004 | No | Lo Limit | On | On | 5.000 | 7.181 | 5.000 | 13.000 | 0.023 |
| FI-2005 | FI-2005 | No | Normal | On | | | 5.000 | 5.000 | | |

Dependents (884)

| Name | Description | Critical | Combined Status | Service Request | Operator Low Limit | Measurement | Steady State Value | Operator High Limit |
|---|---|---|---|---|---|---|---|---|
| AI-2020 | AI-2020 | No | Normal | On | 1.200 | 3.061 | 2.649 | 3.500 |
| AI-2021 | AI-2021 | No | Lo Limit | On | 2.500 | 2.502 | 2.500 | 3.500 |
| AI-2022 (882) | AI-2022 | No | Normal | On | 3.500 | 4.496 | 6.480 | 6.480 (884a) |

FIG. 8

METHOD AND SYSTEM FOR REAL-TIME INDUSTRIAL PROCESS GUIDANCE

RELATED APPLICATION

This application claims the benefit of U.S. Provisional Application No. 63/383,142, filed on Nov. 10, 2022. The entire teachings of the above application are incorporated herein by reference.

BACKGROUND

An example of advanced process control used with industrial processes, such as chemical plants and oil refineries, is model predictive control (MPC). MPC is used to control a process while satisfying a set of constraints. For recent decades, MPC is one of the most widely used advanced process control technologies applied in the process industries.

SUMMARY

MPC controllers are dynamic optimizers that run regularly, typically solving an optimization problem once a minute. To understand the optimizer's behavior at a moment in time, it may be necessary to capture a specific problem for analysis.

As such, there is a need in the process industry for a method to modify the preferred optimization behavior for an industrial process, based on plant operation goals, that does not require challenging and time-consuming trial and error simulations of an MPC controller to understand its solution or how to influence its solution.

Embodiments of the present disclosure address the forgoing and other needs in the process industry. As a nonlimiting example, embodiments address the problem of how a steady-state optimization problem that an MPC controller solves can be modified to produce solutions in real-time that align with operator expectations and enable an operator to influence the controller and, in turn, influence a subject industrial process in desired ways.

An example embodiment is directed to a computer-implemented method for real-time industrial process guidance. To begin, the method receives, in memory of a processor, an operator question. The operator question relates to a user-specified process variable of an MPC controller of an industrial process (e.g., a certain or given industrial process). Next, in response to receipt of the operator question, the method automatically performs a real-time simulation of operational scenario(s) of the industrial process using a steady-state optimization problem of the MPC controller to determine operational characteristics of the industrial process in each of the operational scenario(s). Performing the real-time simulation includes, for each operational scenario, modifying a constraint variable of the steady-state optimization problem. Further, performing the real-time simulation includes, for each operational scenario, using the modified constraint variable, determining, e.g., via a closed-loop gain analysis, an updated value of the user-specified process variable. The determined operational characteristics of the industrial process include the determined updated value of the user-specified process variable. In turn, the method generates, based on the determined operational characteristics of the industrial process, a recommendation responsive to the operator question.

In an embodiment, the operator question further relates to increasing or decreasing the user-specified process variable.

Performing the real-time simulation further includes comparing the determined updated value of the user-specified process variable to a current value of the user-specified process variable. The recommendation includes a recommendation for increasing or decreasing the user-specified process variable. According to another embodiment, the operator question further relates to a target value for the user-specified process variable. Performing the real-time simulation further includes comparing the determined updated value of the user-specified process variable to the target variable. The recommendation includes a recommendation for setting the user-specified process variable to the target value.

Further, in yet another embodiment, the user-specified process variable is a manipulated variable (MV) of the MPC controller or a controlled variable (CV) of the MPC controller. In an embodiment, the recommendation includes any one or a combination of: changing a constraint variable for a MV of the MPC controller, changing a constraint variable for a CV of the MPC controller, activating a MV of the MPC controller, or activating a CV of the MPC controller.

According to another embodiment, performing the real-time simulation further includes identifying a constraint variable. The identified constraint variable has an effect on the user-specified process variable. In one such embodiment, the identifying includes perturbing a value of a constraint variable of the at least one constraint variable. Responsive to detecting that a value of the user-specified process variable has changed in the steady-state optimization problem based on the perturbing, the method determines that the constraint variable has an effect on the user-specified process variable. Responsive to detecting that the value of the user-specified process variable has not changed in the steady-state optimization problem based on the perturbing, the method removes the constraint variable from the real-time simulation of the operational scenario.

Further, in yet another embodiment, the operator question further relates to increasing or decreasing the value of the user-specified process variable. The modifying the constraint variable of the steady-state optimization problem includes constructing an operator profile based on historical data for the constraint variable and modifying the constraint variable of the steady-state optimization problem based on the constructed operator profile. According to one such embodiment, the constructing the operator profile based on the historical data includes constructing the operator profile based on an operator high limit for the constraint variable, an operator low limit for the constraint variable, or an operator target value for the constraint variable.

In an embodiment, the recommendation includes multiple recommendations. The method further includes scoring the multiple recommendations and ranking the multiple recommendations based on the scoring. According to one such embodiment, the scoring includes scoring each recommendation of the multiple recommendations based on minimizing an objective function of the MPC controller or based on an effect on the industrial process of applying the recommendation.

In another embodiment, the performing the real-time simulation further includes simulating the operational scenario(s) of the industrial process based on a real-time execution cycle of the MPC controller.

Another example embodiment is directed to a computer-based system for real-time industrial process guidance. The system includes a processor and a memory with computer code instructions stored or held thereon. In such an embodiment, the processor and the memory, with the computer code instructions, are configured to cause the system to implement any embodiments, or combination of embodiments, described herein.

Yet another example embodiment is directed to a non-transitory computer program product for real-time industrial process guidance. The computer program product includes a computer-readable medium with computer code instructions stored thereon. The computer code instructions are configured, when executed by a processor, to cause an apparatus associated with the processor to implement any embodiments, or combination of embodiments, described herein. As understood by one skilled in the art, one or more processors may execute the computer code instructions to cause the apparatus to implement an embodiment.

It is noted that embodiments of the method, system, and computer program product may be configured to implement any embodiments, or combination of embodiments, described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 3A-3B illustrate a nonlimiting example user interface displaying inputs and outputs in an embodiment.

FIGS. 7A-7C illustrate three nonlimiting example alternate scenarios of modifying a constraint value in an embodiment.

FIG. 8 illustrates a nonlimiting example scenario of establishing new constraints in embodiments.

DETAILED DESCRIPTION

Figure 1:
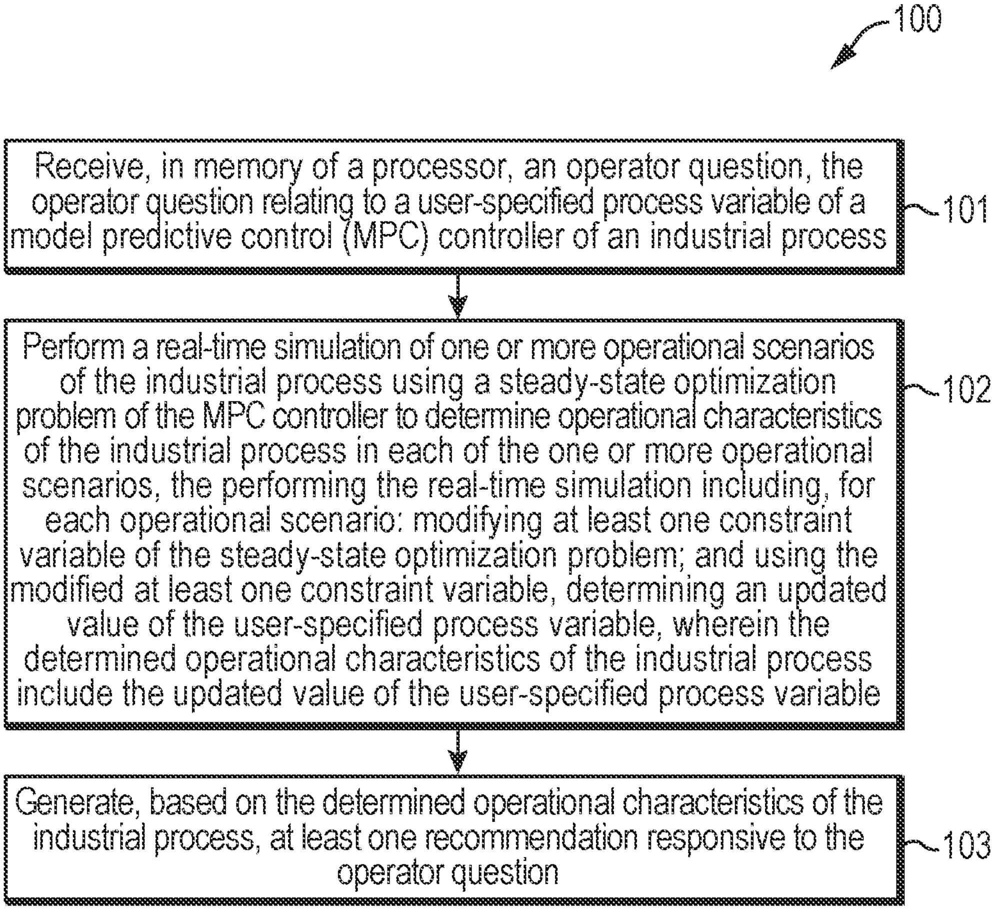
FIG. 1 is a flowchart of a nonlimiting example method for real-time industrial process guidance of the present invention.

A description of example embodiments follows.

MPC is an example of a widely used advanced process control technology applied in the process industry. There are more than 10,000 worldwide applications currently in service. A MPC controller may rely on a process model to predict process behavior, e.g., of controlled variables (CVs), and may make changes to manipulated variables (MVs) so that the MPC controller can keep the process running inside a prescribed constraint set. When inside the constraint set, a MPC controller may also make changes relative to the MVs, so that the process behavior is optimized (as steady-state targets) based on a given economic objective function. The set of constraints for a given steady-state solution may be referred to as binding constraints or an active constraint set.

Due to dependencies and interactions among the process variables and the economic objective function, the overall optimized solution may result in the steady-state targets of specific variables moving contrary to operator expectations. Examples of this behavior may involve variables moving in an opposite direction of operator preference, not moving far enough in a preferred direction, or not changing at all.

To influence behavior of MPC controllers, process operators may routinely adjust process constraints, set targets, or turn on or off variables (adding or removing constraints). Each of these actions may influence a MPC controller by changing an optimization problem that it solves. However, the changes that the operator makes may not influence the MPC controller's behavior as the operator would expect. If the operator cannot figure out why the behavior differs from expectations within a reasonable amount of time, the operator may intervene to bypass the MPC controller by either clamping process constraints, turning off variables, or turning off the entire MPC controller. Any of these intervening actions may lead to a loss of benefits.

One reason for a discrepancy between results in a MPC controller's steady-state solution and an operator's expectation of that solution is that a plant may fundamentally behave differently when it is running with a MPC controller compared to when it is running without a MPC controller.

Process operators may be familiar with running a plant without a MPC controller. To be certified to operate a control board, operators may be trained to operate and control the plant by adjusting setpoints of regulatory PID (proportional-integral-derivative) controllers or by directly controlling valves to influence the process as desired. This background may provide a foundation for their understanding of the process and how they expect it to behave.

From experience with running a plant, when an operator changes a PID loop setpoint by a specific amount, the operator may know approximately how much each dependent variable impacted by that setpoint will respond to that change, all other things being equal. The magnitude and direction of the effect that a unit change in an independent input (MV) has on a dependent process output (CV) may be known as open loop gain or sensitivity. Mathematically, open loop gain may be defined as a change in dependent process output (CV) divided by a change in independent input (MV), as shown by the below equation:

$$\text{Open Loop Gain}_{i,j} = \text{Change in } CV_j / \text{Change in } MV_j$$

In other words, open loop gain may represent how a CV changes per unit change in an MV.

When a MPC controller is running, the MPC controller may specify setpoints and valve positions instead of an operator. Handles the operator can adjust may be values of constraints, which are limits that the setpoints and valves must respect and operate inside of.

Operators may incorrectly assume that increasing a constraint for a setpoint while a MPC controller is running will have a same effect on a process as increasing the setpoint when the MPC controller is not running. Because the MPC controller is solving an optimization problem, it may potentially move all MVs under its supervision at the same time. Each MV that moves affects CVs directly related to it through their own open loop gains. A combination of effects of the open loop gains due to the MVs moving together, instead of one at a time, may result in the process behaving differently if the MPC controller is running. This combined effect may be referred to as closed loop gain for the MPC controller.

Closed loop gain or sensitivity may be a magnitude and direction of an effect that a change in a constraint, either an MV or CV, has on each variable in a MPC controller steady-state solution. Mathematically, closed loop gain may be defined as a change in a constraint of a variable divided by a change in another variable. Changing one constraint or turning on one variable (adding one constraint) may not just change one variable. In other words, closed loop gain may represent how a variable changes per unit change in a constraint of a variable when it is tightened or relaxed. When a constraint is changed, an optimal solution may change, inputs may respond, and a combination of their open loop gains may result in a single observed change per variable. A change in each input divided by a change in a constraint may be a closed loop gain for that input. An overall change for each output may be referred to as a closed loop gain for that output, as shown by the following equation:

$$\text{Closed Loop Gain}_{i,j} = \text{Change in } MV_i \text{ (or } CV_i\text{)} / \text{Change in } MV_j \text{ (or } CV_j\text{) constraint}$$

A value of a closed loop gain may depend on operating values and active constraints. From the above definition, one can see that operators may: change MVs by changing MV constraints; change MVs by changing CV constraints; change CVs by changing MV constraints; and change CVs by changing CV constraints. The foregoing may differ from operators' control of an open loop process where only independent inputs (MVs) may impact output variables (CVs).

MPC controllers may capture open loop input-output relationships in a model matrix. For small MPC controllers with low-density model matrices and few variable interactions, operators may be able to figure out which constraints lead to a desired outcome. Large MPC controllers, with high-density model matrices and lots of variable interactions, may have hundreds of MVs and many hundreds of CVs, making it difficult for operators to determine what they need to do to influence appropriate variables.

Embodiments of the present disclosure (e.g., computer-implemented method and computer-based system) solve the foregoing and other problems by, among other things, replicating a current steady-state optimization problem that a MPC controller is solving, modifying a configuration and setting of the problem in real time, and producing solutions that align with operator expectations and enable operators to influence the controller and, in turn, influence a process in a desired way.

With existing approaches, operators may set constraints and MPC controllers may identify a corresponding optimal solution. Embodiments of the present invention allow operators to specify behavior of the optimal solution and to modify constraints to achieve the desired solution.

To do this, embodiments allow operators to ask how to influence a particular process variable in a desired way, where the process variable may either be an MV or a CV within a MPC controller. Specifically, operators can ask how to increase or decrease a particular process variable. Additionally, operators can ask how to get a particular process variable to reach a specific desired value. To ask their questions, operators may use an interface, e.g., a chatbot interface or other suitable known interface, that may take the operators' questions and, after running through a background simulation and closed loop gain analysis, may provide a list of messages back to the operators.

To answer a question, embodiments may provide a list of recommendations that change a particular process variable, as desired, by changing constraints for MVs (or CVs) or by adding constraints by turning an MV (or CV) back on.

The following is a nonlimiting example of advantages that embodiments provide over existing practices and research. According to existing approaches, advanced process control (APC) engineers may attempt to solve a subject problem themselves with current MPC tools by running either offline or online simulations of the problem, which involves time-consuming trial and error efforts. Solving the problem may take several minutes or even hours, after which time the simulation may have deviated from an online MPC controller and the solution the engineers found may be invalid. The solution of embodiments answers operators' questions by, among other things, running specific and automatic simulation scenarios with a replica of a current online system (industrial process) and provides a set of validated recommendations in seconds.

Embodiments can also include allowable changes in constraints (which may also be referred to as allowable increase and allowable decrease). These allowable changes may indicate how far a constraint can be modified either up (increased) or down (decreased) and produce the same active constraints. The solution of embodiments may not only limit how far a constraint can be moved (increased, decreased) and remain a constraint, but may also limit how far a constraint can be moved based on how operators usually adjust the constraint. Moreover, the solution of embodiments can develop a profile that is based on operator behavior and that determines what move size (amount of increment, amount of decrement) should be for each constraint based on the current constraint value.

FIG. 1 is a flowchart of a method 100 for real-time industrial process guidance according to the principles of the present invention. The method 100 is a computer-implemented method performed by a digital processor. At step 101, method 100 begins by receiving, in memory of the processor, an operator question. The operator question relates to a user-specified process variable of a model predictive control (MPC) controller of an industrial process.

Continuing with FIG. 1, at step 102, method 100 responsively and automatically performs a real-time simulation of operational scenario(s) of the industrial process using a steady-state optimization problem of the MPC controller to determine operational characteristics of the industrial process in each of the operational scenario(s). Performing the real-time simulation includes, for each operational scenario, modifying a constraint variable of the steady-state optimization problem. Further, performing the real-time simulation includes, for each operational scenario, using the modified constraint variable, determining, e.g., via a closed-loop gain analysis, an updated value of the user-specified process variable. The determined operational characteristics of the industrial process include the determined updated value of the user-specified process variable.

Referring again to FIG. 1, at step 103, method 100 generates and outputs, based on the determined operational characteristics of the industrial process, a recommendation responsive to the operator question.

As noted, method 100 of FIG. 1 is computer-implemented and, as such, the functionality and effective operations, e.g., the receiving (101), performing (102), and generating (103), are automatically implemented by one or more digital processors. Further, method 100 can be implemented using any computer device or combination of computing devices known in the art. Among other examples, method 100 can be implemented using computer(s)/device(s) 50 and/or 60 described hereinbelow in relation to FIGS. 22 and 23 and interchangeably referenced as system 100.

A nonlimiting example given below provides motivation for the description of embodiments and principles of the present invention. In the nonlimiting example, an operator may attempt to change a variable, but behavior of the variable (and, ultimately, of a subject industrial process including the variable) goes in an opposite direction of the operator's expectation. The process operator may be familiar with open loop gains of the subject industrial process.

Figure 2:
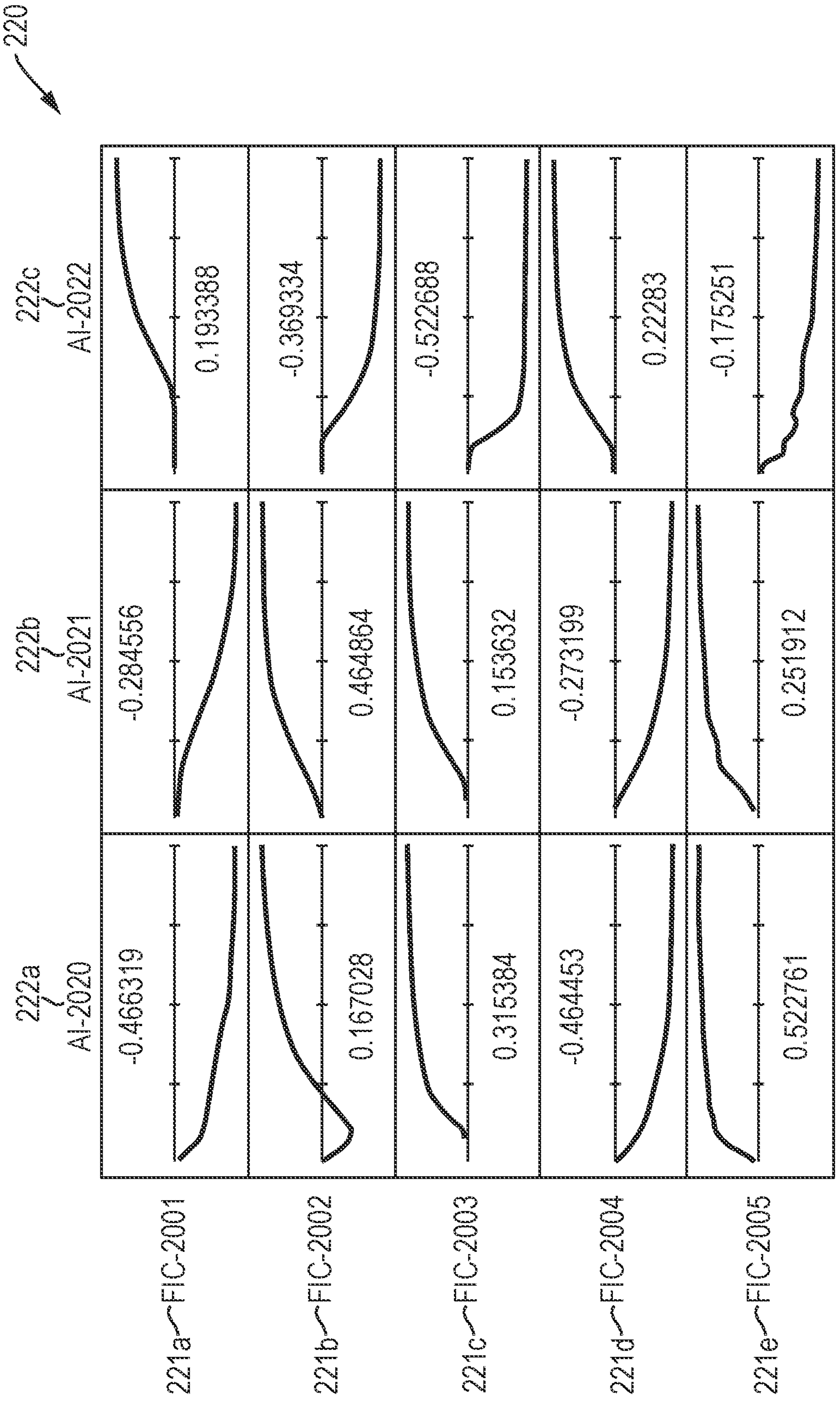
FIG. 2 is a nonlimiting example model matrix illustrating open loop gains between inputs and outputs according to embodiments of the present invention.

FIG. 2 is an example model matrix 220 illustrating open loop gains between inputs 221*a*-221*e* and outputs 222*a*-222*c* according to an embodiment. As shown in FIG. 2, numerical values in each cell may represent the open loop gain between each pair of inputs and outputs. For example, when input 221*a* (FIC-2001) is increased by 1, open loop gain for output 222*c* (AI-2022) may be approximately 0.1934. This can be represented by the following equation:

$$\text{(Change in AI-2022)}=0.1934\text{(Change in FIC-2001)}$$

Because gain is a proportionality constant, and input 221*a* (FIC-2001) and output 222*c* (AI-2022) share a positive gain, if input 221*a* (FIC-2001) increases, then output 222*c* (AI-2022) may also increase. A MPC controller may also invert this relationship to calculate an input value, as shown by the following equations:

$$\text{(Change in FIC-2001)}=(1/0.1934)\text{(Change in AI-2022)}$$

$$\text{(Change in FIC-2001)}=5.171\text{(Change in AI-2022)}$$

Figure 3A:
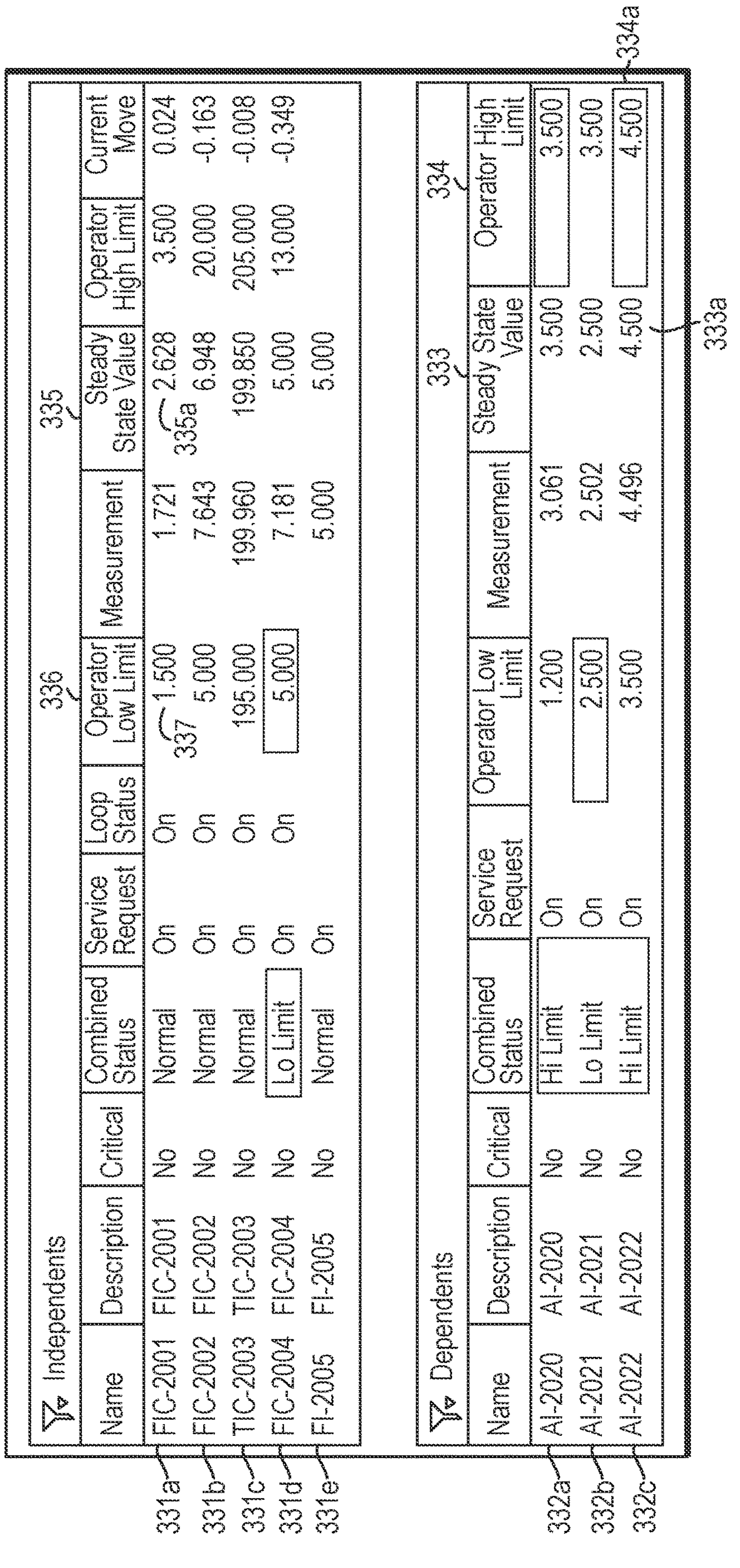

FIGS. 3A-3B illustrate an example user interface 330 displaying inputs 331*a-e* and outputs 332*a-c*. The inputs 331*a*-331*e* have operator low limits 336 and steady state values 335. Likewise, the outputs 332*a*-332*c* have steady state values 333 and operator high limits 334. As shown in FIG. 3A, input 331*a* (FIC-2001) has a steady state value 335*a* of 2.628 and an operator low limit 337 of 1.5, while output 332*c* (AI-2022) has a steady state value 333*a* of 4.5 and an operator high limit 334*a* of 4.5.

With reference to FIG. 3A, if output 332*c* (AI-2022) were constrained at its high limit 334*a* of 4.5 and the operator wanted to increase input 331*a* (FIC-2001), the operator may consider the relationship between input 331*a* (FIC-2001) and output 332*c* (AI-2022) (e.g., as depicted by the relationship between input 221*a* and output 222*c* in FIG. 2), and think that by increasing output 332*c* (AI-2022), input 331*a* (FIC-2001) would increase. However, a problem is that a MPC controller may not just invert the single-input single-output (SISO) relationship between output 332*c* (AI-2022) and input 331*a* (FIC-2001). Instead, the MPC controller may invert an entire multiple-input multiple-output (MIMO) model matrix, e.g., model matrix 220 (FIG. 2).

Referring now to FIG. 3B, when the operator increases the high limit 334 for output 332*c* (AI-2022) by 1—i.e., from high limit 334*a* of 4.5 in FIG. 3A to high limit 334*b* of 5.5 in FIG. 3B—output 332*c* (AI-2022) may go up to a steady state value 333*b* of 5.5. However, the steady state value 335 for input 331*a* (FIC-2001) may go down from steady state value 335*a* of 2.628 in FIG. 3A to steady state value 335*b* of 1.5 in FIG. 3B—instead of up, contrary to what the operator might have expected.

Reviewing the definition of closed loop gain, one can determine closed loop gain between, on the one hand, the change in the high limit 334 of output 332*c* (AI-2022), and, on the other hand, the steady state value 335 of input 331*a* (FIC-2001). This may be shown by the following equations:

$$\text{Closed Loop Gain}_{i,j}=\text{Change in MV}_i\text{ (or CV}_i\text{)/Change in MV}_j\text{ (or CV}_j\text{) constraint}$$

$$\text{Closed Loop Gain}=\text{(Change in FIC-2001)/(Change in AI-2022 high limit constraint)}$$

$$\text{Closed Loop Gain}=(1.5-2.628)/(5.5-4.5)$$

$$\text{Closed Loop Gain}=-1.128$$

One can see from the above example that the closed loop gain, i.e., −1.128, is negative instead of positive, as an operator relying on the open loop gain would expect. This is because the effect that leads to output 332*c* (AI-2022) increasing may not be strictly due to input 331*a* (FIC-2001). This outcome may be due to a combination of open loop gains. For example, a steady state optimizer may also change input 331*a* (FIC-2001), input 331*b* (FIC-2002), and/or input 331*c* (TIC-2003). If we look at a combination of open loop gains for, e.g., input 331*a* (FIC-2001), input 331*b* (FIC-2002), and input 331*c* (TIC-2003), and consider how much the inputs changed, we may see what impact input 331*a* (FIC-2001) actually has, as shown by the below equations:

$$\text{Change in AI-2022}=(\text{Open Loop Gain}_{FIC\text{-}2001})\text{(Change in FIC-2001)}+(\text{Open Loop Gain}_{FIC\text{-}2002})\text{(Change in FIC-2002)}+(\text{Open Loop Gain}_{TIC\text{-}2003})\text{(Change in TIC-2003)}$$

$$\text{Change in AI-2022}=(0.1934)(1.5-2.628)+(-0.3693)(7.052-6.948)+(-0.5227)(197.446-199.850)$$

$$\text{Change in AI-2022}=1.000$$

Even though the high limit 334 for output 332*c* (AI-2022) was increased by 1 in FIG. 3B, it may be a combination of input open loop gain effects that results in the steady state solution of output 332*c* (AI-2022) increasing up to the new limit value 333*b* (5.5). Contrary to what the operator may expect, input 331*a* (FIC-2001) may go down instead of up (e.g., decrease instead of increase). It may really be input 331*c* (TIC-2003) going down (decreasing) that leads to output 332*c* (AI-2022) increasing, not input 331*a* (FIC-2001), which may contribute to output 332*c* (AI-2022) moving down (decreasing).

The above phenomenon may lead to a costly trial and error approach as the operator makes changes that do not intuitively impact the subject industrial process. Using embodiments of the present disclosure (as a nonlimiting example, the computer-based system/method 100 of FIG. 22), the operator can tell the system what the operator wants to achieve and the system will tell the operator which variables to modify and how to modify them.

Figure 4A:
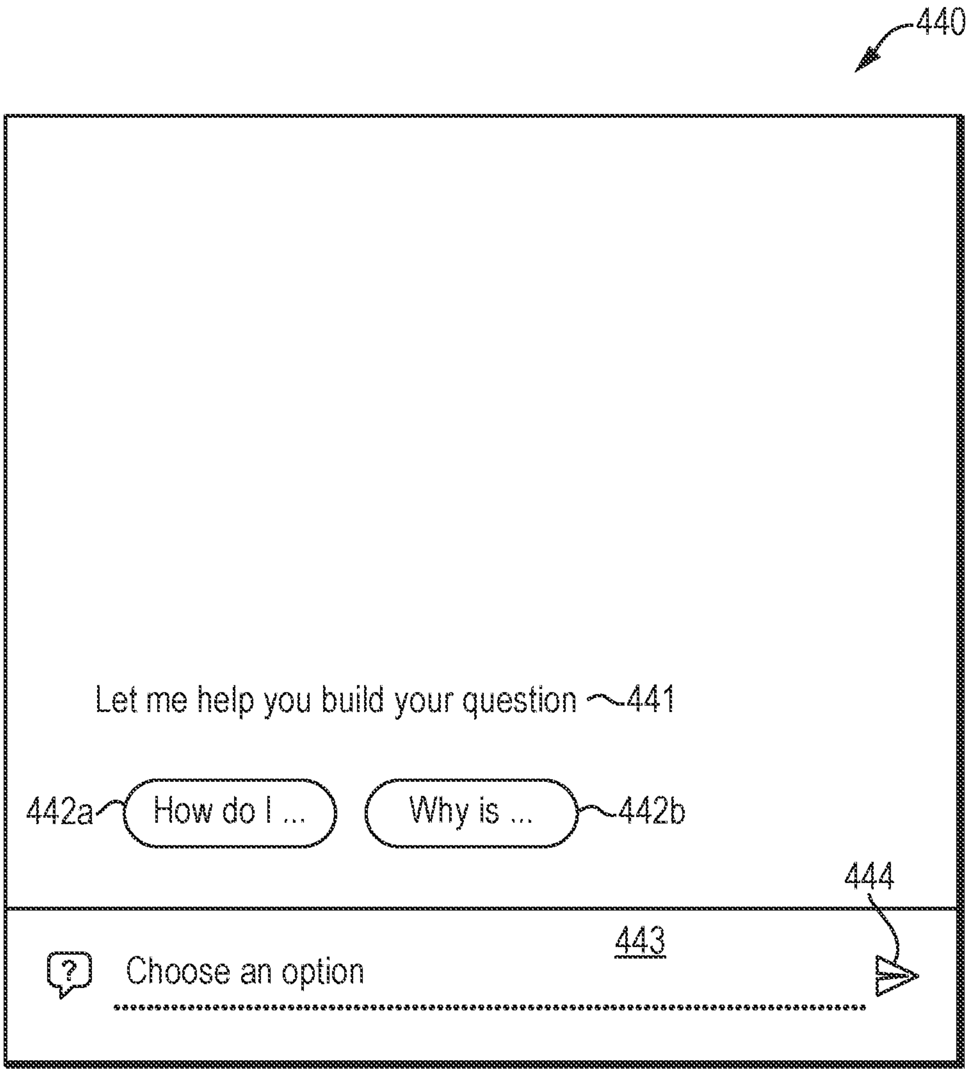
FIGS. 4A-4C illustrate a nonlimiting example chatbot interface for question building, formulating, or otherwise configuring in an embodiment.
Figure 4B:
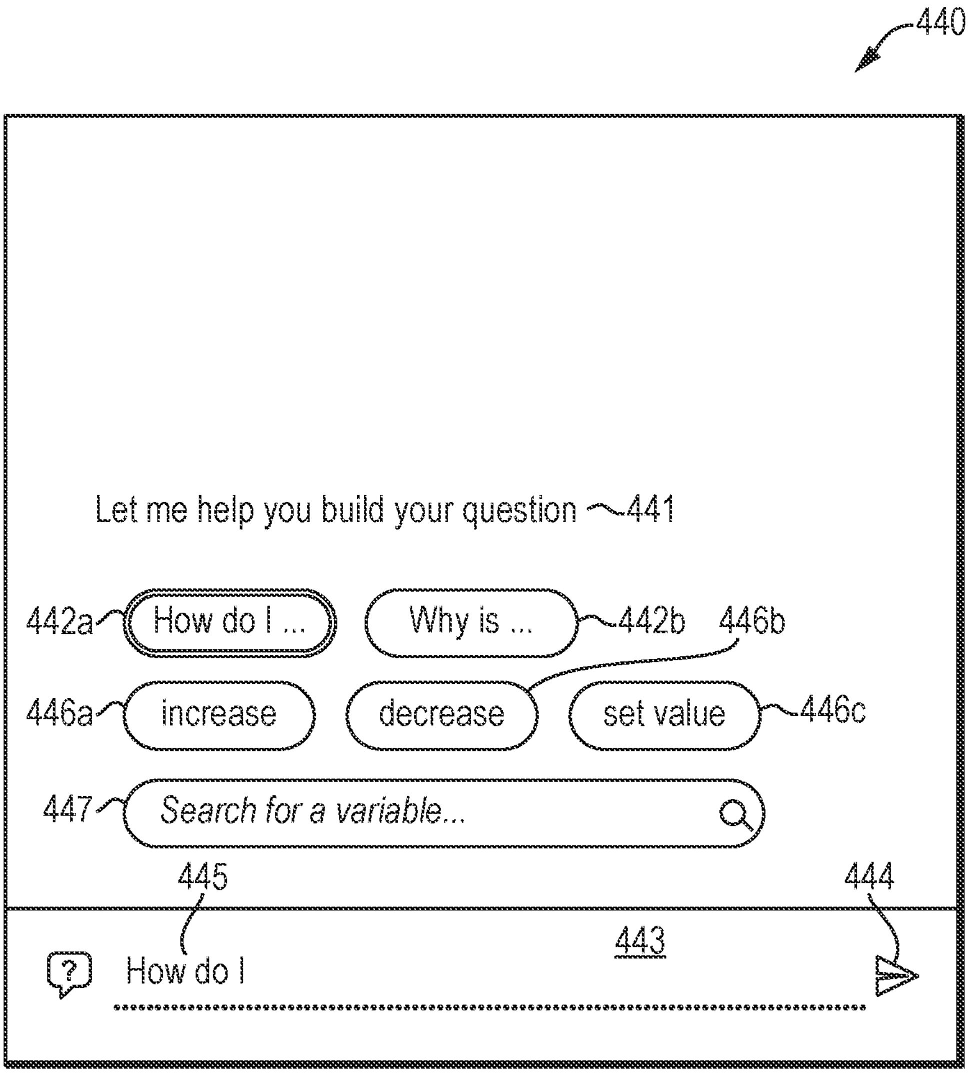
Figure 4C:
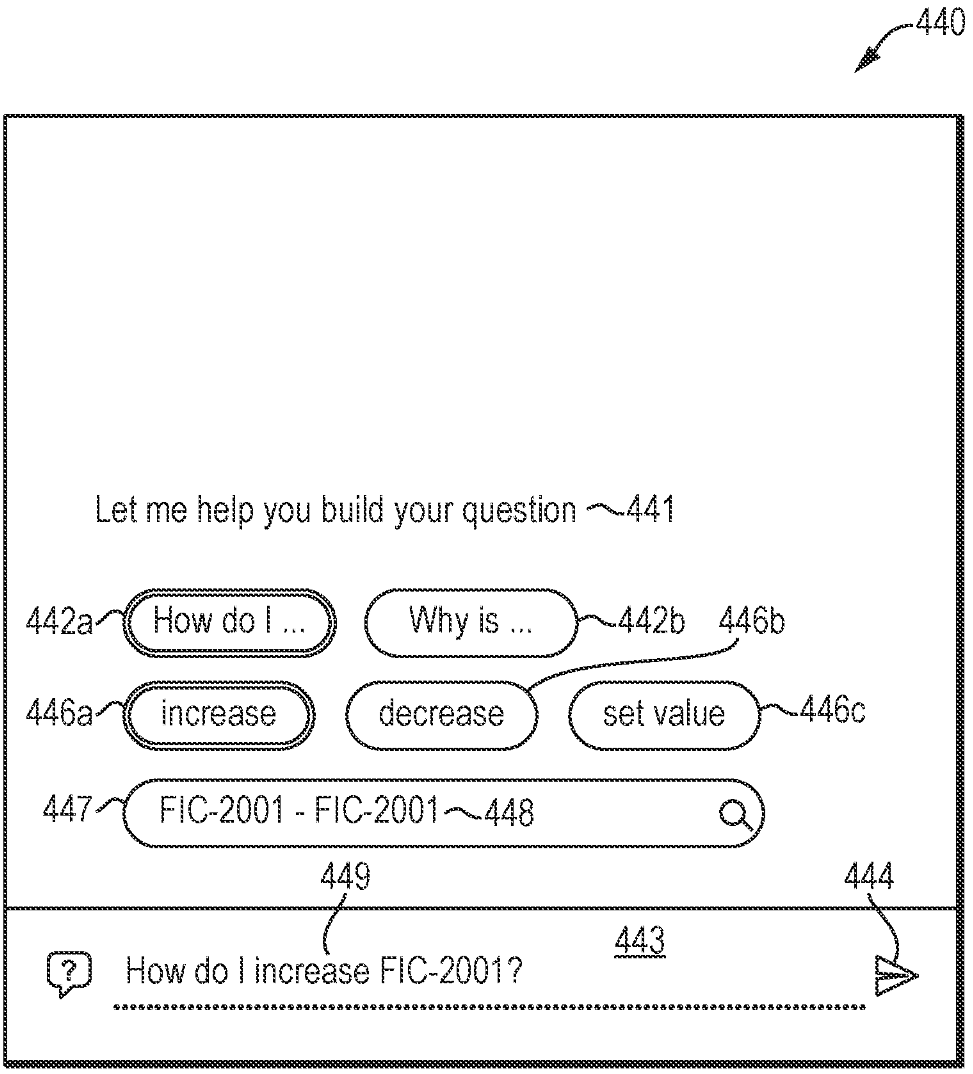

When the operator wants to ask the system a question, the operator may open an interface, which may be, for nonlimiting example, a chatbot interface, and ask how to change a particular variable, e.g., input 221*a* (FIG. 2) or 331*a* (FIG. 3A). The system may take the question and determine an intent of the question. For example, the system may determine which variable the operator wants to change and how the operator wants to change it. Embodiments are not limited to a particular interface such as a chatbot interface, and instead may use any suitable interface known to those of skill in the art. As one nonlimiting example, embodiments may use natural language processing for the operator to write freeform questions for which intent is determined. Another nonlimiting example is a graphical user interface that embodiments may use to help the operator build up, construct, or otherwise formulate a structured question—similar to a query builder that may prompt the operator to select buttons or tiles within the chatbot interface and variable filters that build up the desired question. FIGS. 4A-4C are illustrative.

FIGS. 4A-4C illustrate an example chatbot interface 440 for question building. As shown in FIG. 4A, interface 440 may initially display a message 441 that prompts the user to select among button 442*a*, for asking how to change a variable, and button 442*b*, for asking why a variable is behaving unexpectedly. Further, interface 440 may include text area 443 that displays the question being constructed, as well as button 444 for submitting the question. While the question is still being constructed, button 444 may be greyed out, dimmed, or otherwise disabled/deactivated. After question building is complete, button 444 may be highlighted, illuminated, or otherwise enabled/activated for user interactive operation.

FIG. 4B illustrates interface 440 after the user selects button 442*a*, i.e., to ask how to change a variable. As shown in FIG. 4B, highlighting or another suitable known technique may be used to indicate that button 442*a* is selected, and interface 440 may correspondingly display user-selectable buttons 446*a*, 446*b*, and 446*c*, for asking how to increase a variable, how decrease a variable, or how to set a value for a variable, respectively. Further, selecting button 442*a* may cause text 445 to be displayed in text area 443, reflecting partial construction of the user question. Lastly, interface 440 may display search box 447 to allow the user to search for a variable. As mentioned hereinabove with respect to 442*b* of FIG. 4A, some embodiments can perform simulations and generate guidance regarding other types of queries, such as why a particular variable is behaving unexpectedly.

FIG. 4C illustrates interface 440 after the user selects button 446*a*, i.e., to ask how to increase a variable, and uses search box 447 to search for variable name 448, e.g., a name (FIC-2001) of input variable 221*a* (FIG. 2) or 331*a* (FIG. 3A). As shown in FIG. 4C, highlighting or another suitable known technique may be used to indicate that button 446*a* is selected. Further, selecting button 446*a* and searching for variable name 448 may cause text 449 to be displayed in text area 443, reflecting completed construction of the user question. Lastly, button 444 may be highlighted, illuminated, or otherwise enabled/activated to allow user-interactive submission of the constructed question.

To provide answers (recommendations), embodiments (system/method 100) may make a copy of a current state of a MPC controller, which may include all relevant information needed to exactly replicate a steady-state solution of the online MPC controller for its current execution cycle.

Because MPC controllers may typically run once a minute, it is desirable to provide solutions (recommendations) quickly, e.g., at a speed comparable to workflow time or near real-time of the operator. If too much time elapses, the solutions may be invalid if a controller faces significant disturbances or an active constraint set has changed.

To be fast and timely, embodiments may adjust constraints for each variable in an active constraint set (a subset of the variables within a controller) one at a time, and by a small perturbation, to simulate how the online MPC controller would behave. Small perturbations may be made to keep a new optimal solution having the same active constraint set, which may ensure quick solution convergence and quickly identify which constrained variables influence a key variable in question.

After influential variables are identified, their constraints may be stepped by a move size that is customary for process operators. The move sizes (amounts of increase or decrease) that operators typically make to the constraints are changes that are large enough to change a subject industrial process, but conservative enough to not disturb the process. A size of a move (amount of an increase or decrease) may vary from constraint to constraint. This step may then be validated to confirm that a particular variable moves in a desired direction and that the step does not move the subject industrial process too far. Further, embodiments may provide a set of recommendations to change a constraint and explain what effect the changes will have on the particular variable.

Figure 5A:
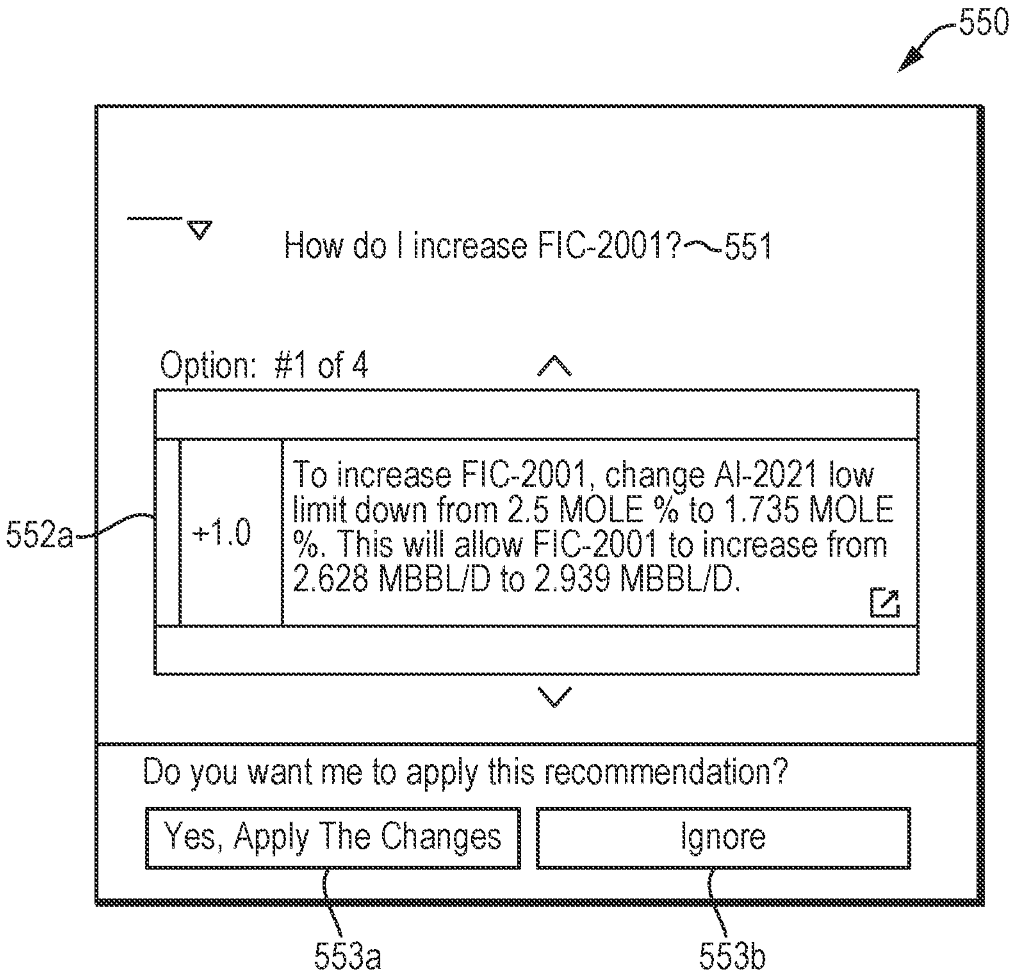
FIGS. 5A-5D illustrate a nonlimiting example user interface for providing a set of recommendations for changing a value in an embodiment.

FIGS. 5A-5D illustrate an example user-interactive interface 550 for providing a set of recommendations for changing a value. As shown in FIG. 5A, interface 550 may display a user question 551 (which may correspond to, e.g., constructed question 449 of FIG. 4C), a first recommendation 552*a*, and user-selectable buttons 553*a-b*. When activated/engaged/selected/pressed, button 553*a* or 553*b* may cause a currently displayed recommendation, e.g., 552*a*, to be applied/accepted or ignored/rejected, respectively.

Figure 5B:
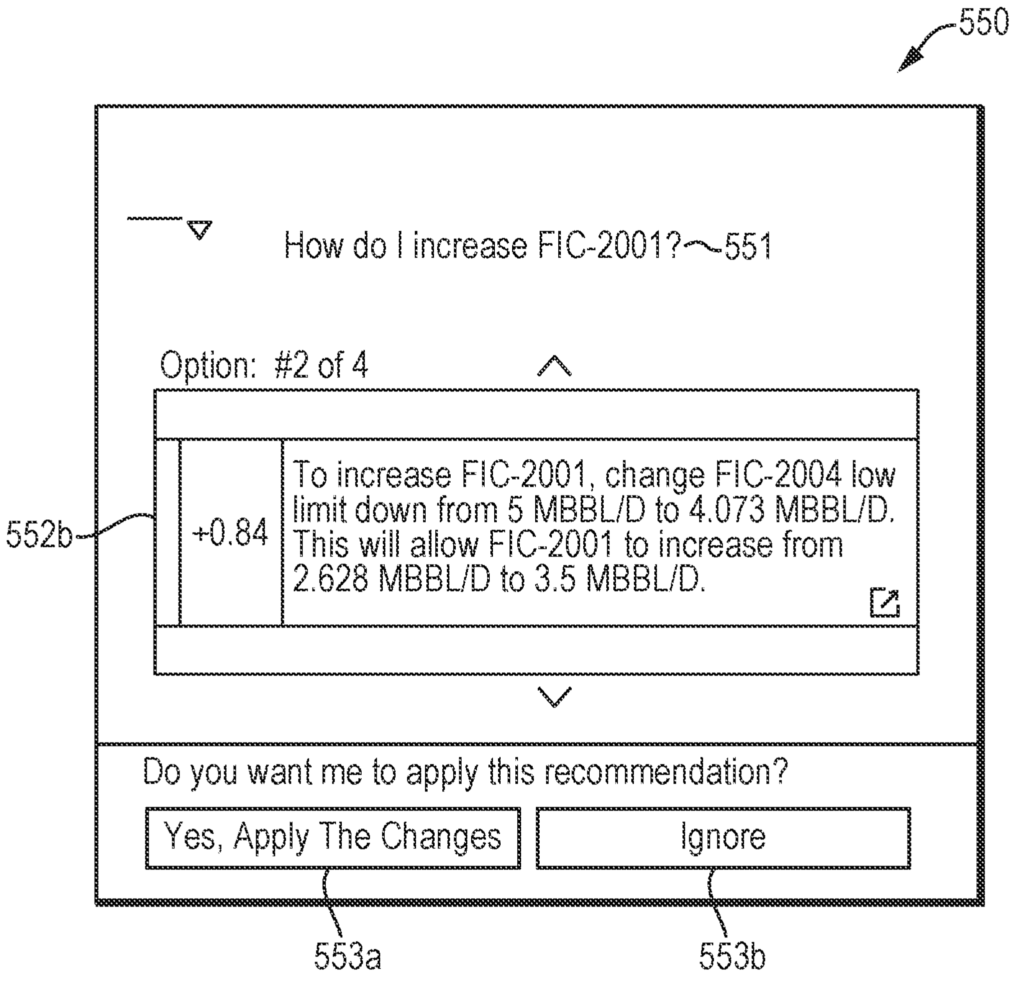

FIG. 5B illustrates example interface 550 displaying a second recommendation 552*b*.

Figure 5C:
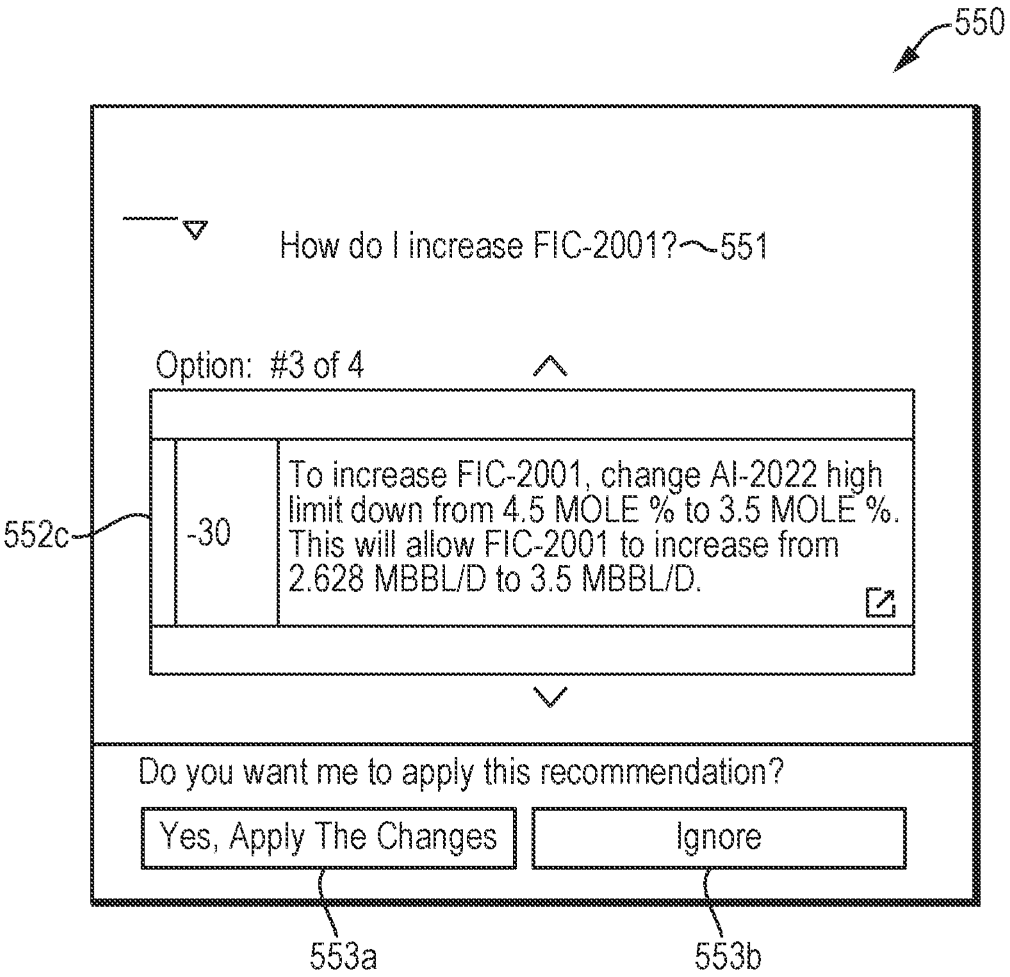

FIG. 5C illustrates example interface 550 displaying a third recommendation 552*c*. Note that the third recommendation 552*c* may suggest decreasing a high limit, e.g., high limit 334 (FIG. 3A), for AI-2022, e.g., output 222*c* (FIG. 2) or 332*c* (FIG. 3A), to increase FIC-2001, e.g., input 221*a* (FIG. 2) or 331*a* (FIG. 3A). This recommendation may be consistent with the closed loop gain that was observed and may provide a correct recommendation to an operator.

Figure 5D:
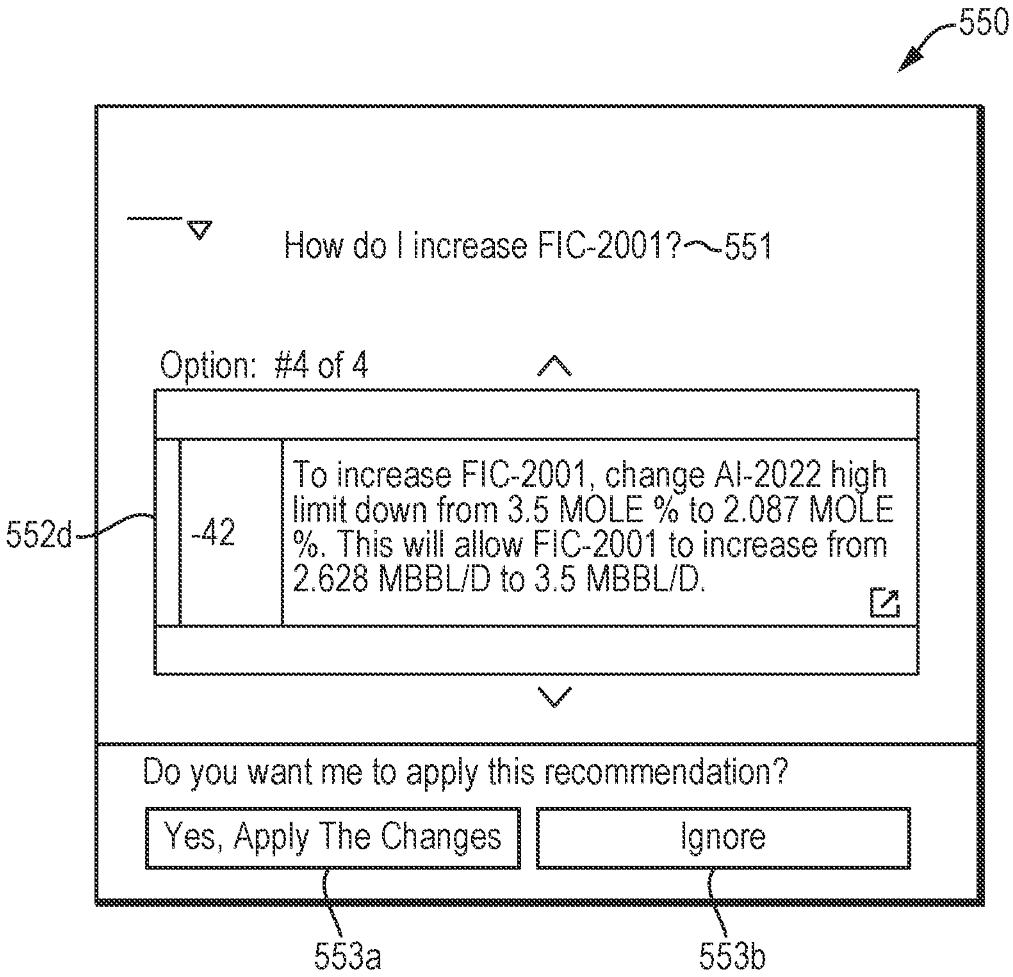

FIG. 5D illustrates example interface 550 displaying a fourth recommendation 552*d*.

MPC controllers may run on dynamic industrial processes, and changing constraints of a steady-state optimization problem may dramatically shift process behavior. If a constraint is moved, and remains constrained, but results in a new variable reaching its active constraint, a move size may be reduced to a size where the new actively constrained variable occurs. Embodiments may conservatively recommend moves that gently guide an operator and the process into the new constraint space and may avoid changing the process too much or too far.

An example of the foregoing behavior may be seen if an operator starts off with a MPC controller in the same state shown in FIG. 3A and asks how to decrease input 331*c* (TIC-2003) of FIG. 3A.

Figure 6:
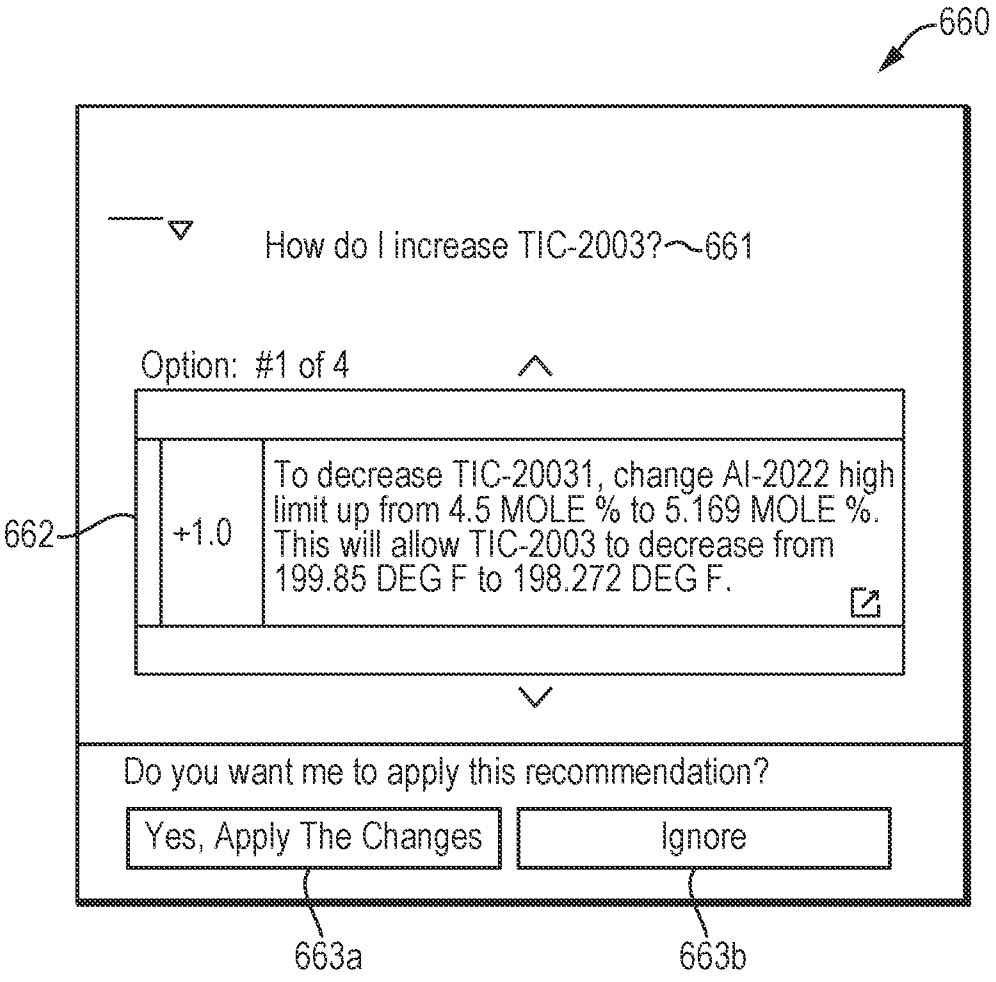
FIG. 6 illustrates another example user interface displaying a first recommendation in an embodiment.

FIG. 6 illustrates another example user-interactive interface 660 displaying a first recommendation 662. As shown in FIG. 6, interface 660 may also display a user question 661 (which may correspond to, e.g., the abovementioned question concerning input 331*c* of FIG. 3A) and user-selectable buttons 663*a-b*. The first recommendation 662 may demonstrate the foregoing behavior when embodiments suggest changing an operator high limit, e.g., high limit 334 (FIG. 3A), of AI-2022, e.g., output 222*c* (FIG. 2) or 332*c* (FIG. 3A), from 4.5, e.g., value 334*a* (FIG. 3A), to 5.169. Embodiments may reduce a recommended move size (amount) because a new active constraint is detected that occurs when a high limit, e.g., high limit 334 (FIG. 3A), for AI-2022 reaches 5.169.

Figure 7A:
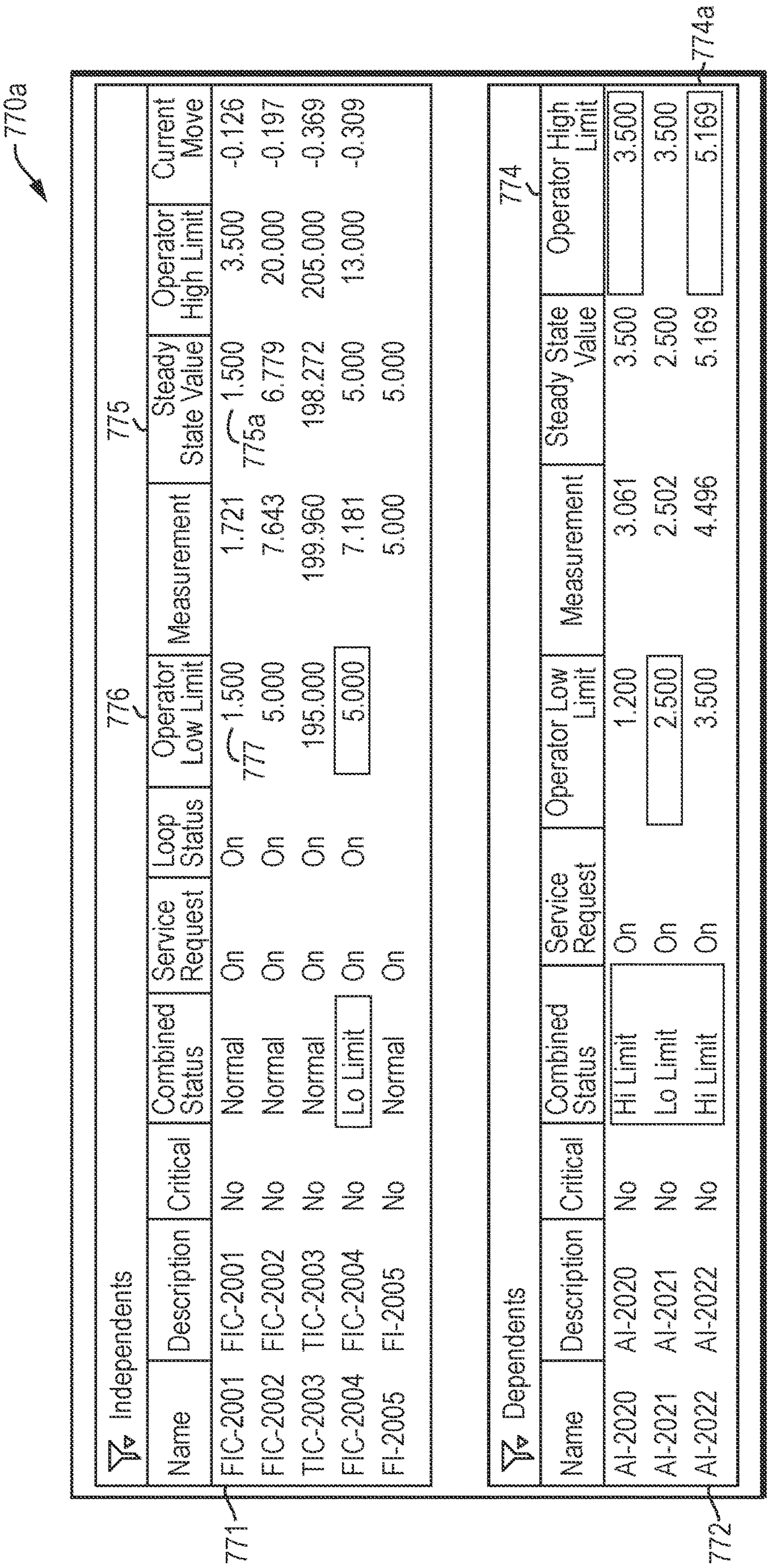
Figure 7C:
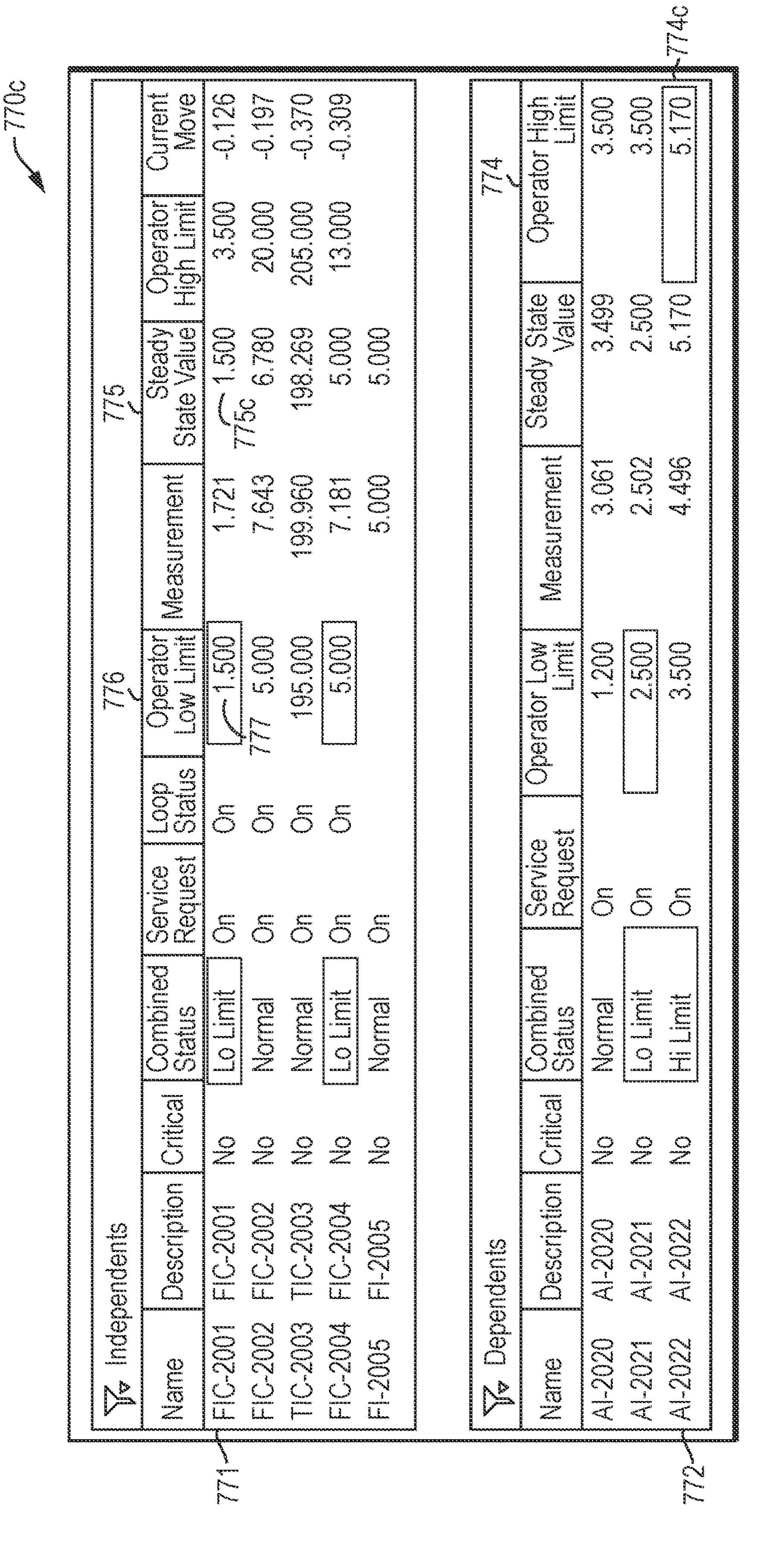

FIGS. 7A-7C illustrate three example alternate scenarios 770*a*-770*c* of modifying a constraint value.

As shown in first scenario 770*a* of FIG. 7A, if an operator applies change 662 of FIG. 6 (e.g., via operation of button 663*a* of FIG. 6), the operator may see that when a high limit 774 for output 772 (AI-2022) is set to a high limit value 774*a* of 5.169, a steady state value 775 for input 771 (FIC-2001), i.e., a steady state value 775*a* of 1.5, approaches its low limit value 777 of 1.5 (shown in operator low limit column 776).

To demonstrate that scenario 770*a* of FIG. 7A may put a controller on an edge of a new constraint, one can see what happens if the operator instead changes the high limit 774 for output 772 (AI-2022) to be slightly below or slightly above the recommended value as depicted in FIGS. 7B and 7C, respectively.

As shown in second scenario 770*b* of FIG. 7B, if the operator sets the high limit 774 for output 772 (AI-2022) to a high limit value 774*b* of 5.168 instead—i.e., 0.001 less than the high limit value 774*a* of 5.169 of FIG. 7A—then the steady state value 775 for input 771 (FIC-2001) may be a steady state value 775*b* of 1.502 instead of the steady state value 775*a* of 1.5 of FIG. 7A, and thus above its low limit 777.

As shown in third scenario 770*c* of FIG. 7C, if the operator instead sets the high limit 774 for output 772 (AI-2022) to value 774*c* (5.17)—i.e., 0.001 greater than value 774*a* (5.169) of FIG. 7A—then input 771 (FIC-2001) may reach its low limit of value 775*c* (1.5).

To continue with FIG. 7C, embodiments may determine that a new constraint occurs, e.g., input 771 (FIC-2001) has a steady state value 775*c* reaching its low limit of value 777 of 1.5, and may limit a constraint move change to a value where the new constraint occurs.

If, hypothetically, it is not determined when new constraints come in, then a constraint set and a subject industrial process may change considerably if a large enough change in a constraint is made capable of leading to a desired outcome that an operator asked for.

FIG. 8 illustrates an example scenario 880 of establishing new constraints. As shown in FIG. 8, a high limit 884 for output 882 (AI-2022) may be increased to a high limit value 884*a* of 6.480 until output 882 (AI-2022) is no longer a constraint, and steady state values 885 for input 881*a* (FIC-2001) and input 881*c* (TIC-2003) are both at their low limits, i.e., value 885*a* of 1.5 and value 885*c* of 195, respectively. This detection of new active constraints may provide conservative recommendations that smoothly change a MPC controller from constraint set to constraint set, instead of making significant changes to the constraint set that could dramatically change the controller's current behavior.

If an operator wants a particular process variable to reach a specific desired value, the operator may ask embodiments (e.g., computer-based system 100) how to reach the specific value.

Figure 9:
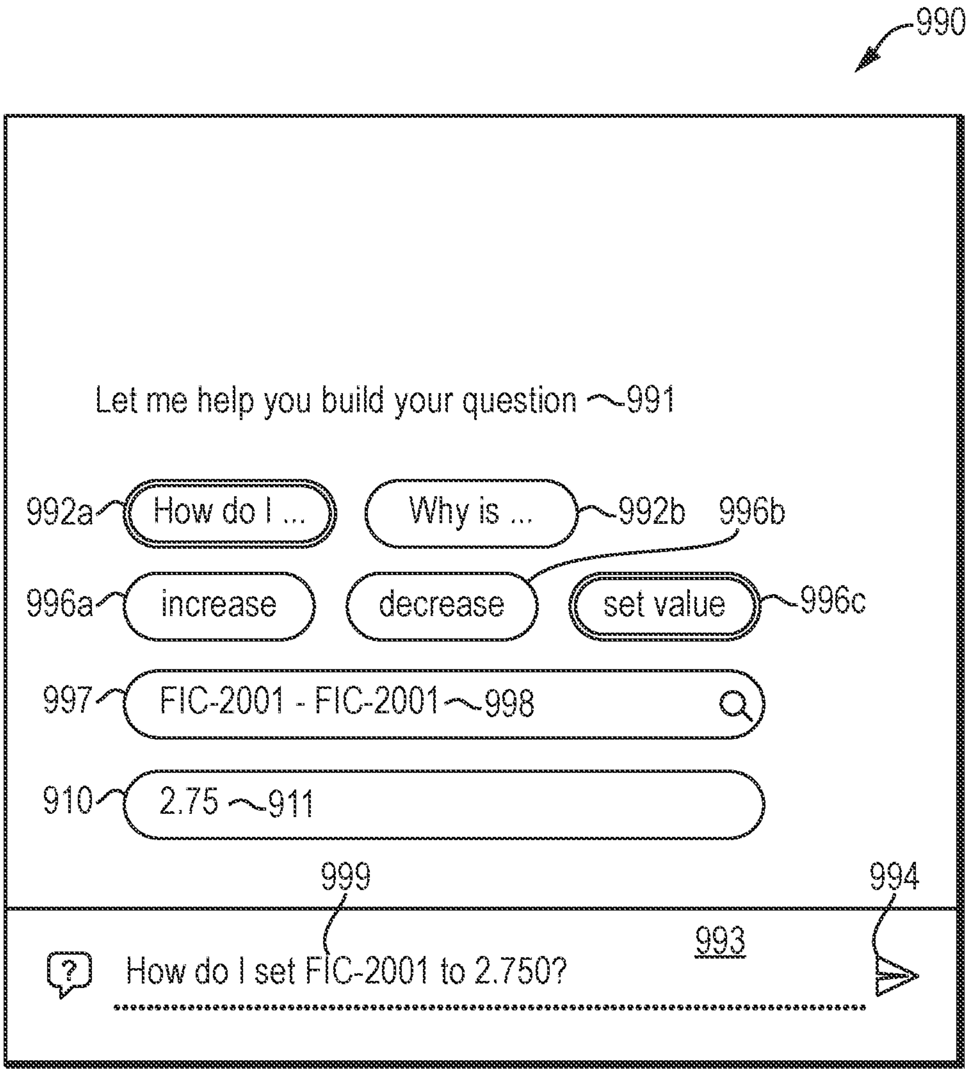
FIG. 9 illustrates a nonlimiting example of building up, configuring, or otherwise formulating a question in a chatbot interface in an embodiment.

FIG. 9 illustrates an example of building up, configuring, or otherwise formulating a question in a chatbot interface 990, which displays message 991, first set of buttons 992*a-b*, and second set of buttons 996*a-c*. As shown in FIG. 9, the operator has selected buttons 992*a* and 996*c*, which, collectively, are for asking how to set a value for a variable. The operator has also used search box 997 to search for variable name 998, e.g., a name (FIC-2001) of input variable 221*a* (FIG. 2), 331*a* (FIG. 3A), 771 (FIG. 7A), or 881*a* (FIG. 8). Finally, the operator has used text field 910 to input the desired value, e.g., a value 911 of 2.75. As a result of the foregoing, fully built-up, configured, or otherwise formulated question 999 may be displayed in text area 993.

Continuing with FIG. 9, upon submission of question 999 (e.g., via user-selectable operation of button 994), the system 100 may first identify influential variables as previously described hereinabove. The system 100 may then iteratively adjust the influential variables to get the particular variable as close to the specific desired value as possible.

Figure 10A:
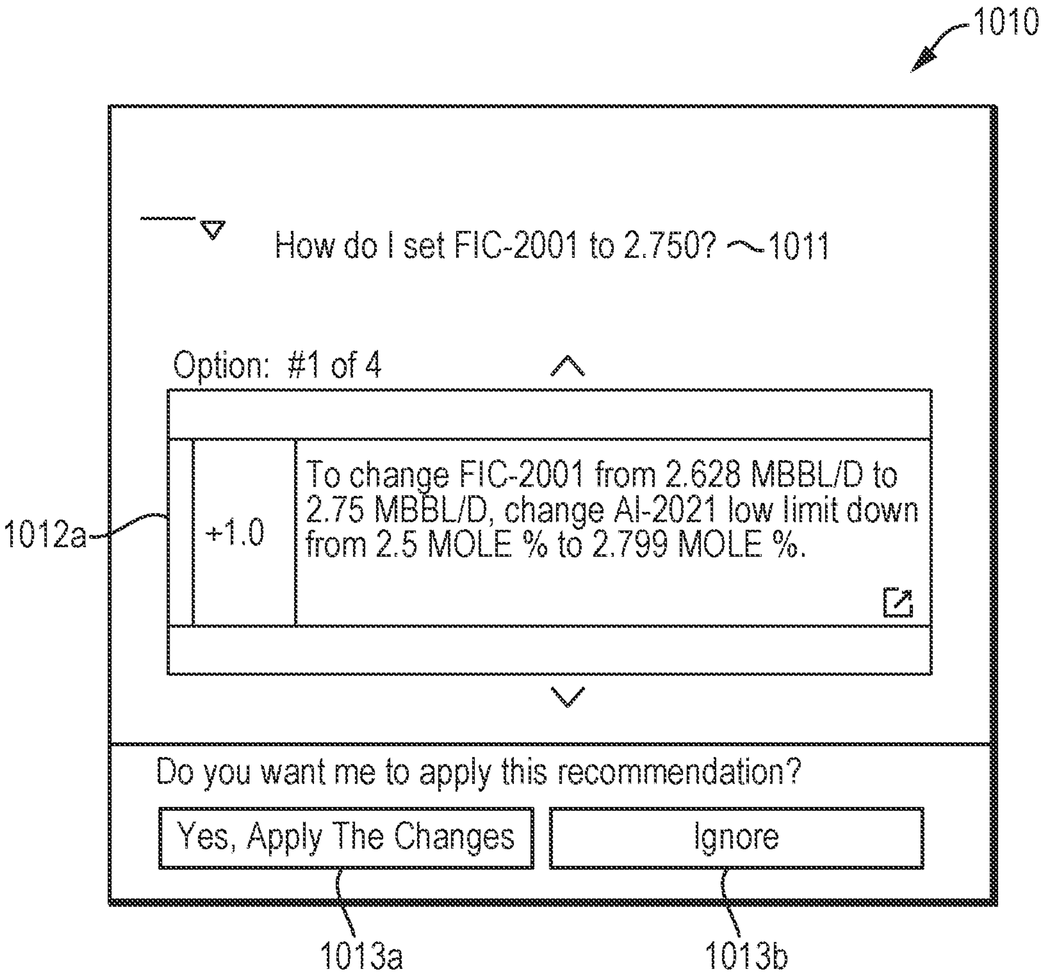
FIGS. 10A-10D illustrate a nonlimiting example interface for providing a set of recommendations for reaching a particular value in an embodiment.

FIGS. 10A-10D illustrate an example user-interactive interface 1010 for providing a set of recommendations for reaching a particular value. As shown in FIG. 10A, interface 1010 may display a user question 1011 (which may correspond to, e.g., constructed question 999 of FIG. 9), a first recommendation 1012*a*, and user-selectable buttons 1013*a-b*. When activated/engaged/selected/pressed, button 1013*a* or 1013*b* may cause a currently displayed recommendation, e.g., 1012*a*, to be applied/accepted or ignored/rejected, respectively. The first recommendation 1012*a*, if applied, may result in a particular variable, e.g., as specified by variable name 998 of FIG. 9, exactly reaching a desired value, e.g., as specified by user input value 911 of FIG. 9.

Figure 10B:
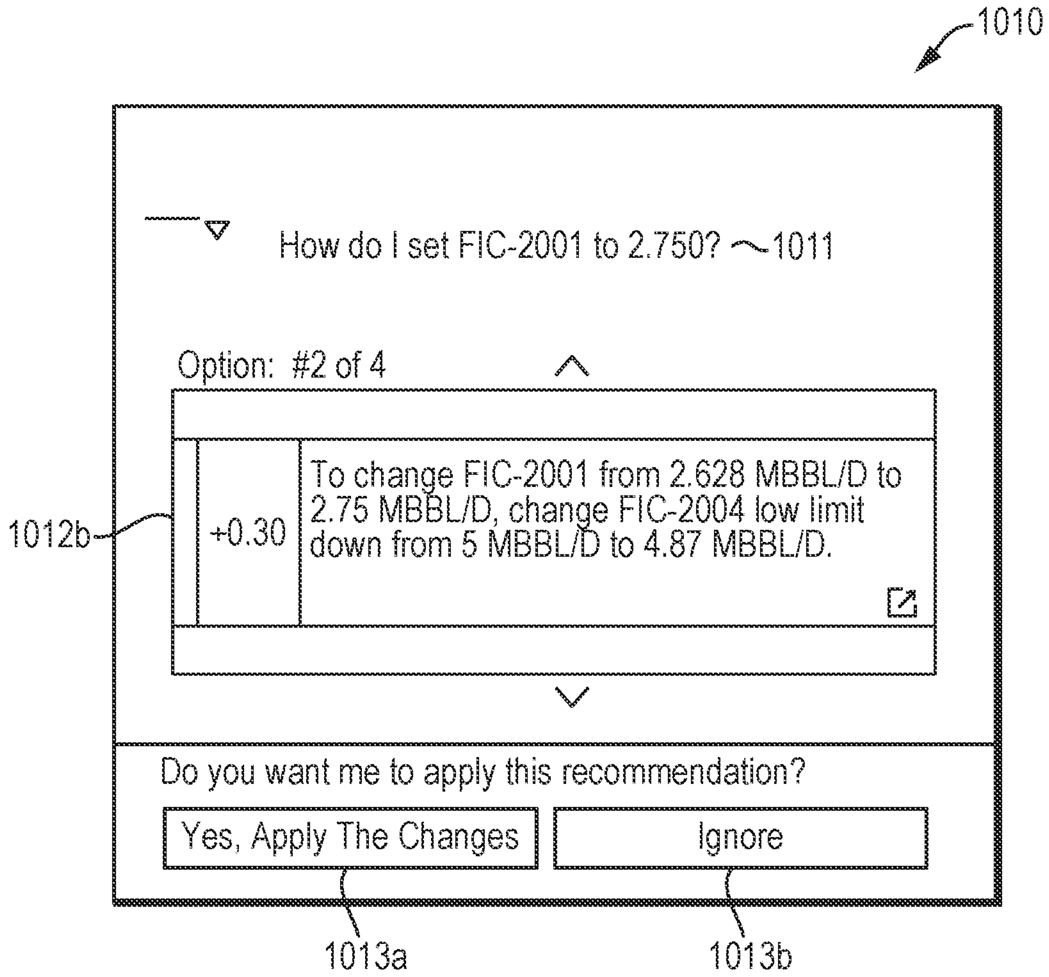

FIG. 10B illustrates example interface 1010 displaying a second recommendation 1012*b*.

Figure 10C:
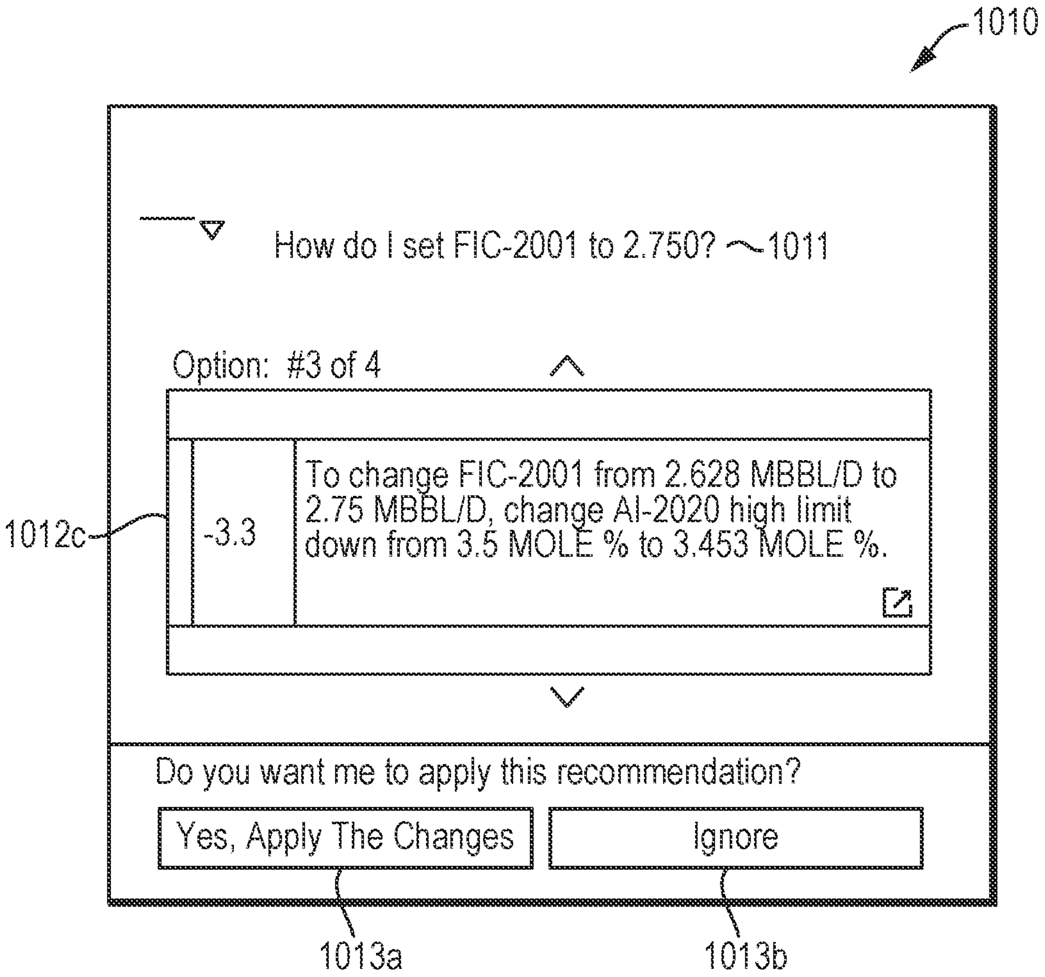

FIG. 10C illustrates example interface 1010 displaying a third recommendation 1012*c*.

Figure 10D:
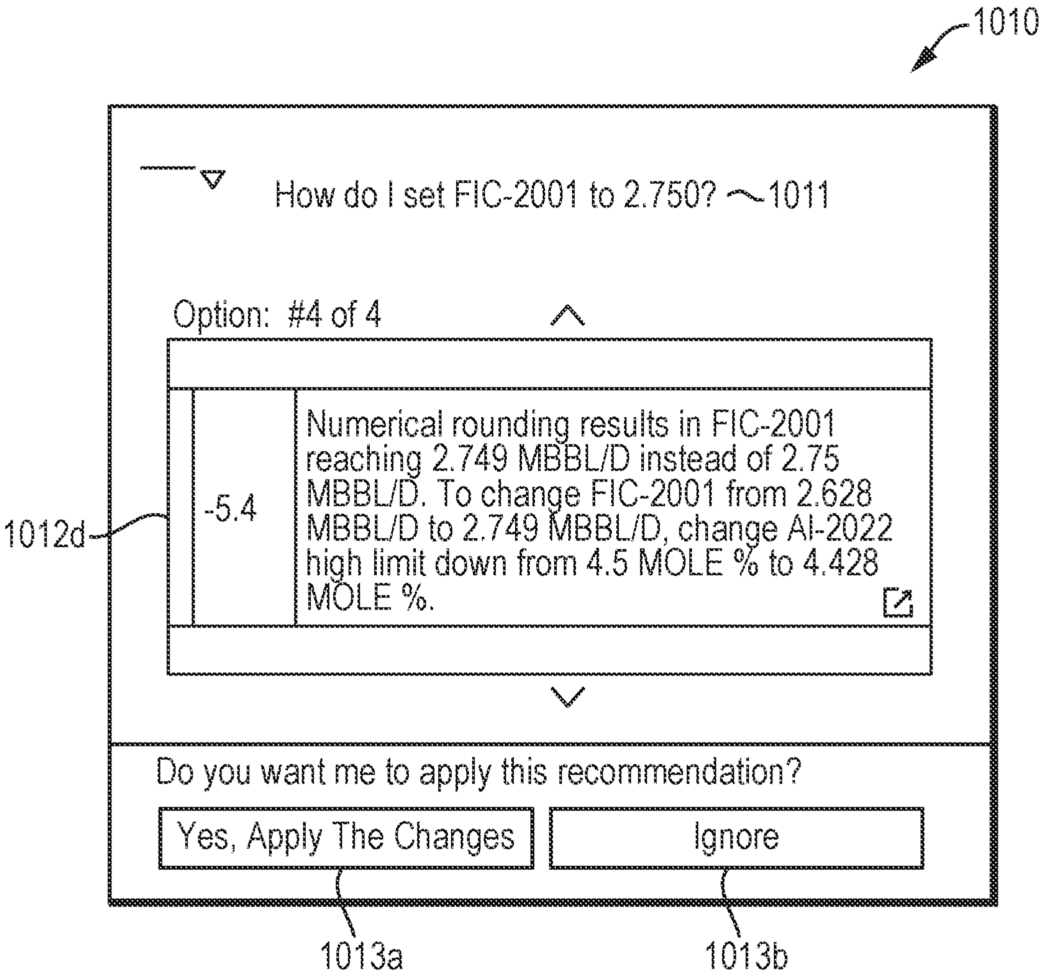

FIG. 10D illustrates example interface 1010 displaying a fourth recommendation 1012*d*. As shown in FIG. 10D, fourth recommendation 1012*d*, if applied, may result in the particular variable, e.g., as specified by variable name 998 of FIG. 9, reaching less than the desired value, e.g., as specified by user-entered value 911 of FIG. 9, due to numerical rounding.

Embodiments may utilize, for instance, a line search or bracketing techniques, among other examples, that iterate with a steady-steady optimizer to converge to a desired value. Any other suitable technique known to those of skill in the art may also be used.

MPC programs may be built with engineering controls to protect a subject industrial process and ensure operators cannot accidently enter in limits that are unsafe or unreasonable for the controlled process. Engineers may specify limits that restrict constraints set by operators to be within a certain range. These limitations that provide validation for the constraints entered by operators may be referred to as engineering limits.

If the only influential variable that embodiments identify is the variable itself, e.g., the only way to increase feed is to increase a low limit for feed, embodiments may proceed to perform additional analysis because a solution is trivial. An operator may know about this trivial solution, but may ask because the operator wants an alternative one.

Figure 11A:
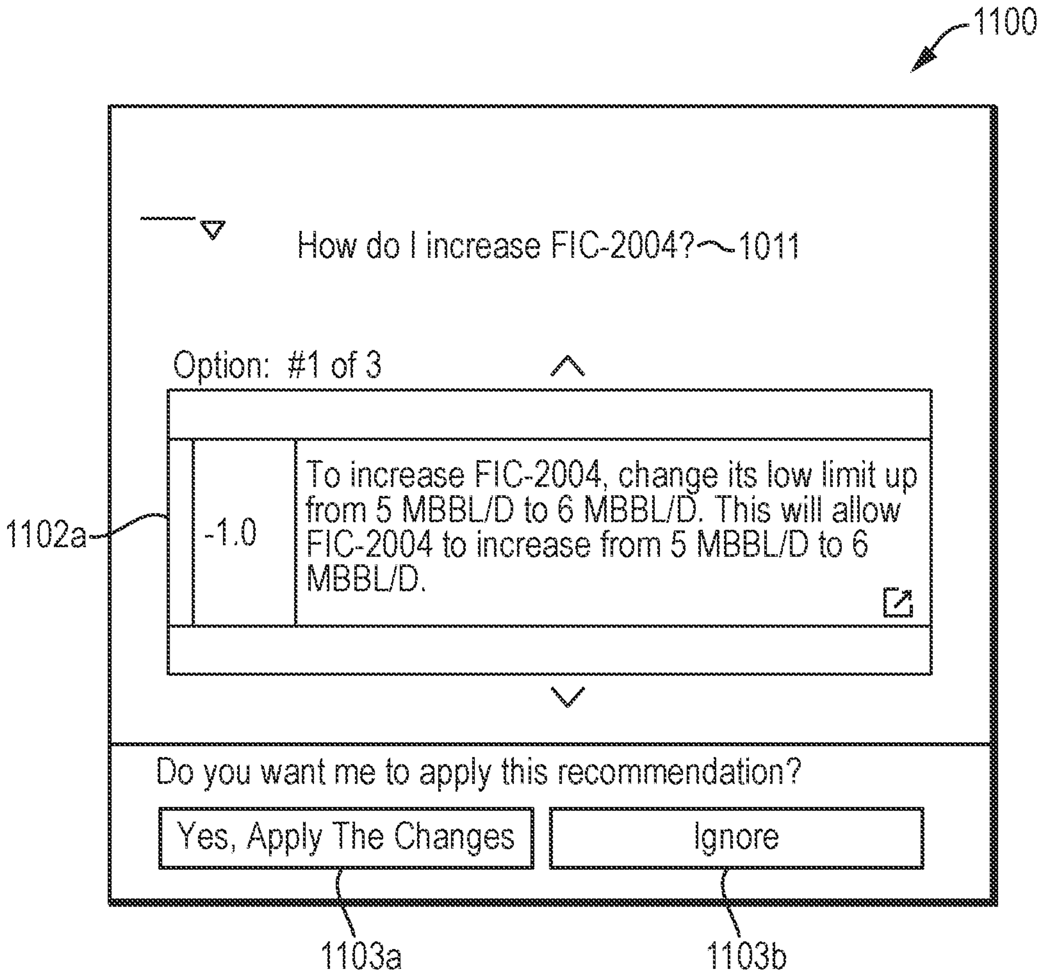
FIGS. 11A-11C illustrate another example interface for providing a set of recommendations for changing a value in an embodiment.
Figure 11B:
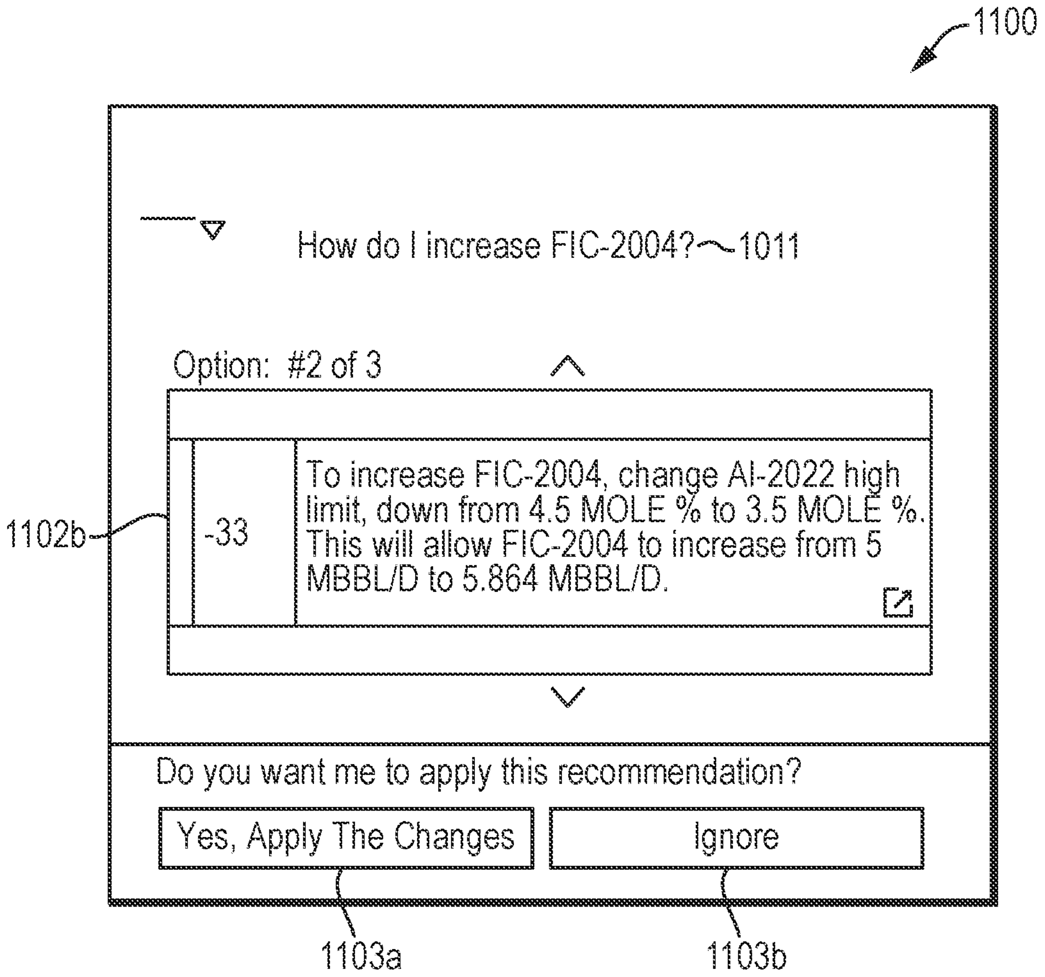
Figure 11C:
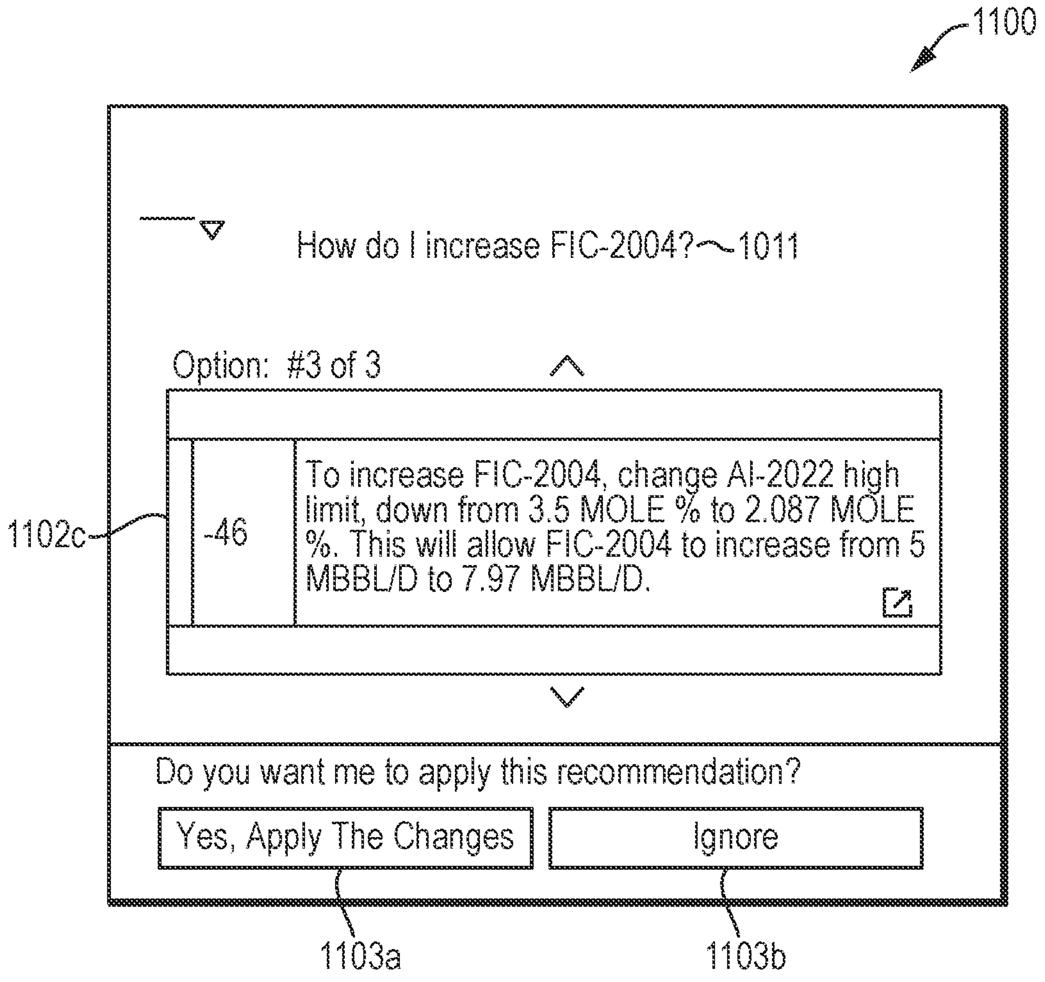

FIGS. 11A-11C illustrate another example user-interactive interface 1100 for providing a set of recommendations for changing a value. As shown in FIG. 11A, interface 1100 may display a user question 1101, a recommendation 1102*a*, and user-selectable buttons 1103*a*-1103*b*. When activated/engaged/selected/pressed, button 1103*a* or 1103*b* may cause a currently displayed recommendation, e.g., 1102*a*, to be applied/accepted or ignored/rejected, respectively. The displayed user question 1101 may reflect an operator asking how to increase FIC-2004, e.g., input 221*d* (FIG. 2) or 331*d* (FIG. 3A), up from a value of its low limit, e.g., 336 (FIG. 3A). The only nonzero closed loop gain FIC-2004 may have is with itself. Embodiments may identify two additional recommendations by performing additional analysis.

FIG. 11B illustrates example interface 1100 displaying an additional recommendation 1102*b*.

FIG. 11C illustrates example interface 1100 displaying another additional recommendation 1102*c*.

The additional analysis may involve embodiments relaxing constraints for other constrained variables all the way to engineering limits and seeing which of them influence a key variable. It may not be necessary to step all the way to the engineering limits to observe a change while it makes a convenient bound. There may be uncertainty with how far to step away from a current constraint to observe a change because small perturbations may produce no change. Instead of gradually exploring a solution space and running multiple simulations, embodiments may relax the constraint as far as possible and observe an effect. This approach may identify other variables that have an effect. Once influential variables are identified, embodiments may again step them by a move size that is customary for process operators and then validate the step. Further, embodiments may provide a set of recommendations to change a constraint and explain what effect that change will have on the particular variable.

To ensure that the move recommendations are consistent with operator moves, embodiments may scan controller history data for each constraint to determine whether or not operators routinely adjust that constraint, and, if so, how do they adjust it. Constraints used by the MPC controller may not usually be true process constraints. There may usually be a buffer between a MPC controller constraint and the true process constraint that can vary based on operator confidence in the MPC controller or based on how the operator is running a subject industrial process. If the buffer is large, then operators may be comfortable opening limits up. As they get closer, operators may tend to make smaller, more conservative moves.

Embodiments may develop and update a unique profile per constraint consistent with the foregoing observations. As an upper limit within a MPC controller approaches a true upper limit, move sizes that an operator is willing to make may become smaller. Embodiments may restrict profiles with monotonicity, for one-sided constraints, or parabolicity, for two-sided constraints, required to ensure that move size recommendations become more conservative as the MPC constraint approaches the true constraint.

Embodiments may scan the controller history data and look for changes in values of operator high limits, low limits, and targets to develop a profile, in the form of, e.g., a piecewise constant function or other suitable known function, that maps a current value of a constraint limit to a limit move size that operators typically make.

To give a nonlimiting example, if an operator changes a limit constraint from 20 to 30 units, this change may be observed in a history and used to develop a profile. Assuming the operator made the limit change intentionally and not by mistake, it may be inferred that when the constraint is equal to 20 the operator is willing to make a change of 10 and increase the constraint to 30.

Figure 12:
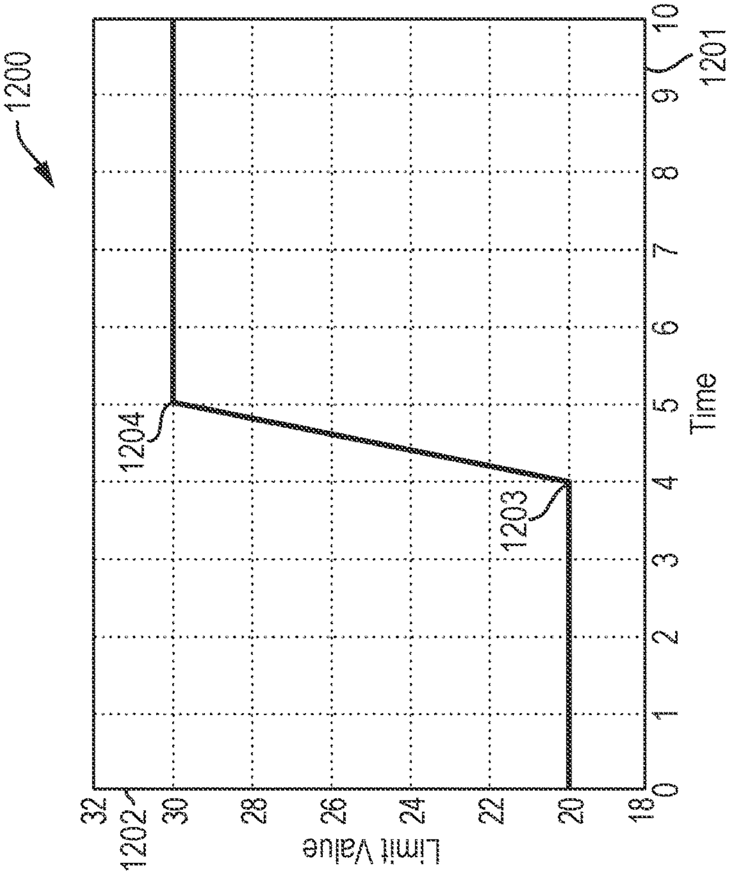
FIGS. 12-13 are example graphs depicting operator changes to constraint limits in embodiments.
Figure 13:
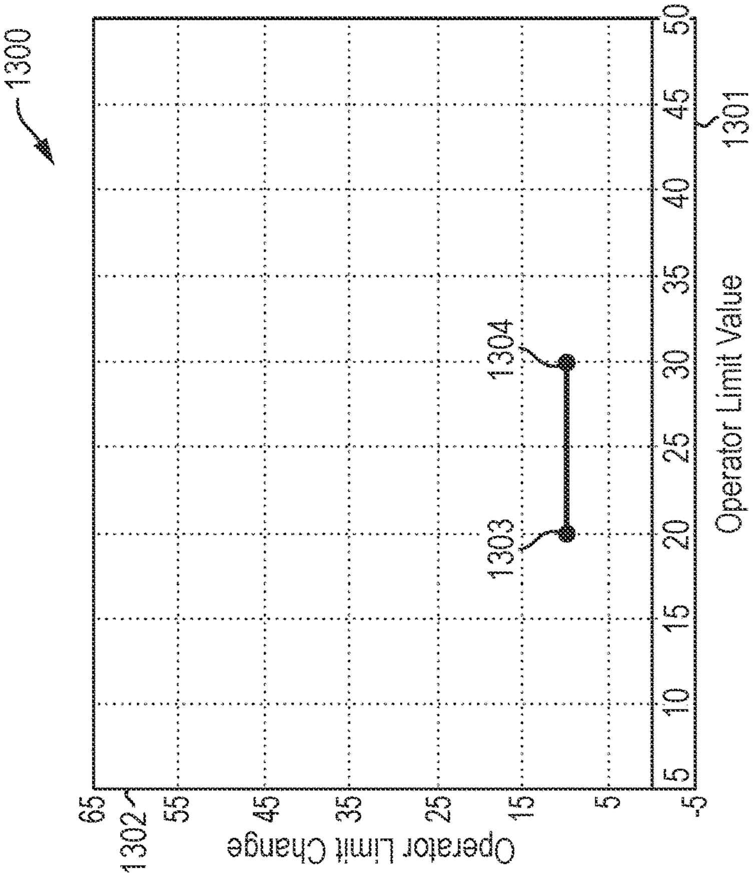

FIGS. 12 and 13 are example graphs 1200 and 1300, respectively, depicting operator changes to constraint limits. As shown in FIG. 12, a move change may be plotted as a pair of two points 1203 and 1204 on a cartesian plot where x-axis 1201 indicates time values before and after the move change and y-axis 1202 indicates respective limit values corresponding to the time values.

As shown in FIG. 13, a move change may be plotted as a pair of two points 1303 and 1304 on a cartesian plot where x-axis 1301 indicates values of a constraint before and after the move change and y-axis 1302 indicates a magnitude of the move size. In the future if this operator limit is at a value of 20 and embodiments want to move this limit up, embodiments may infer that the operator is comfortable increasing the limit by 10, up to 30, because embodiments may have seen the operator do this action in the past, e.g., by moving from point 1203 to point 1204 shown in FIG. 12. Similarly, if the operator limit is at a value of 30 and embodiments want to move the limit down, embodiments may infer that the movement is bidirectional and that the operator would be comfortable decreasing the limit down by 10, going to 20, e.g., as in a move from point 1204 to point 1203.

Continuing with FIG. 13, if no additional information is available, embodiments may extrapolate and assume that for any value of this limit, the operator is willing to increase or decrease the limit by no more than, e.g., 10, the magnitude of the move size indicated by y-axis 1302. As further nonlimiting examples, if embodiments want to move down from 20, embodiments may infer that the limit could move down to 10. Similarly, if embodiments want to move up from 30, embodiments may assume that the limit could move up to 40. This may also handle situations for any value between 20 and 30, because increasing or decreasing from say 25 would result in the limit going to values never seen before by embodiments. Those values may be 15 when going down, and 35 when going up. If there are no new constraints or a new value of a constraint does not go beyond administrative engineering limits, then it may be up to the operator's discretion to accept a move size from embodiments that the operator has not gone to before.

The simplest constraint profiles may be those like the one just described that consist of a single constant function across all values of a constraint limit, where an operator is willing to make the same size move regardless of where the limit is in relation to the true constraints.

Scanning history data may reveal more than just a single move change in a limit value. Pairs of limit change values for each move an operator makes may be visualized in, e.g., a scatter plot. Other plots and/or graphs known to those of skill in the art are also suitable.

In general, operators may be comfortable making small moves across an entire operating range.

Figure 14B:
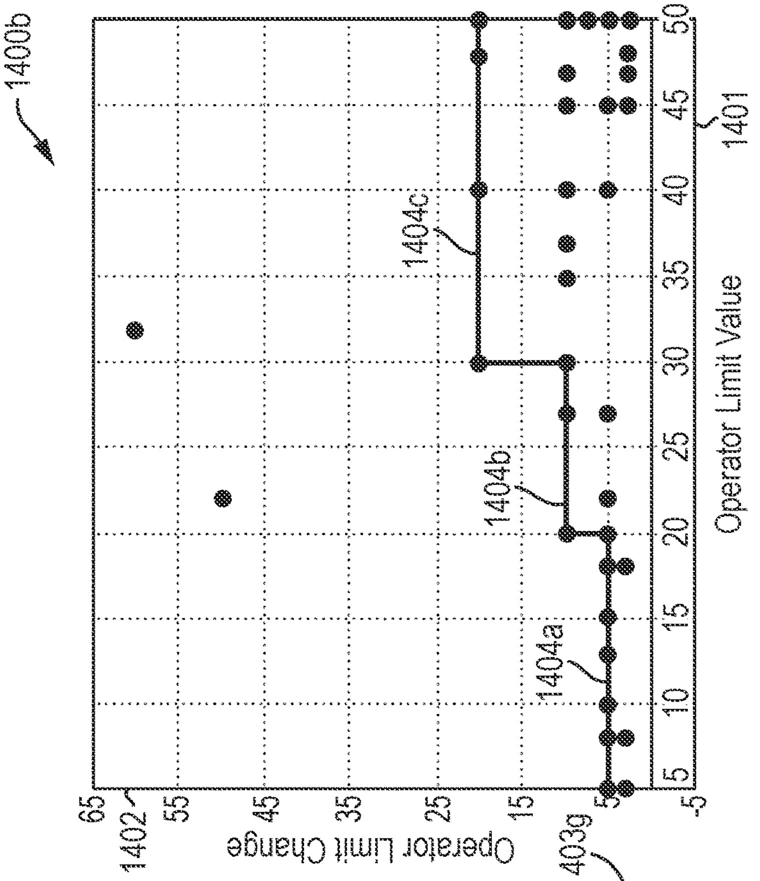
FIGS. 14A-14B are example plots of operator history data used to construct a profile in embodiments.
Figure 14A:
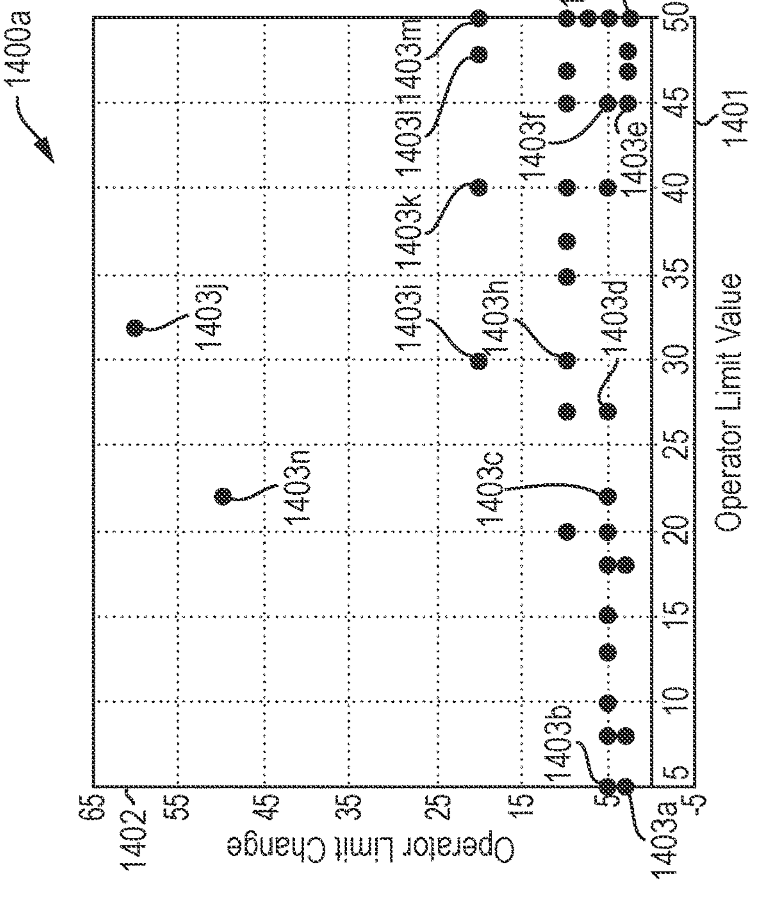

FIGS. 14A and 14B are example plots 1400*a* and 1400*b*, respectively, of operator history data used to construct a profile. As shown in FIG. 14A, x-axis 1401 indicates operator limit values and y-axis 1402 indicates operator limit changes. Referring to a bottom portion of y-axis 1402, one can see the operator may be comfortable making limit changes of 2.5 or 5 across nearly an entire operating range of x-axis 1401, e.g., as reflected by points 1403*a*-*g*.

Continuing with FIG. 14A, everywhere the operator is comfortable making limit move sizes of 2.5, the operator may also be comfortable making limit size changes of 5, e.g., as reflected by pairs of points 1403*a*/1403*b* and 1403*e*/1403*f*. So, in this case the simplest profile that could be constructed across the entire range may be a change of 5 from a limit value of 5 to 50, with embodiments extrapolating as necessary.

In general, such as in the nonlimiting example of FIG. 14A, one may see that the operator's comfort in how far the operator is willing to move a limit changes across the operating range. On a left side of plot 1400*a*, the operator may make smaller moves, e.g., as reflected by points 1403*a*-*d*, and on a right side of plot 1400*a*, the operator may make larger moves, e.g., as reflected by points 1403*h*-1403*m*.

With reference to FIG. 14B, to determine segments, e.g., segments 1404*a*-1404*c*, the data may be broken into buckets like a histogram and statistics may be performed to identify the most typical move the operator makes in each segment. If a maximum move is too large, e.g., point 1403*j* or 1403*n* (FIG. 14A), it may be identified as an outlier and removed from consideration. Techniques to determine outliers may utilize, e.g., standard deviation or interquartile range. Other techniques and/or statistics known to those of skill in the art are also suitable. To continue, embodiments may assume that the operator made a mistake when the operator entered in the value. Further, a maximum move size the operator is comfortable with may be identified in each segment, and then segments may be modified or merged to ensure a, e.g., monotonic or parabolic shape is enforced. Other shapes known to those of skill in the art are also suitable.

Figure 16:
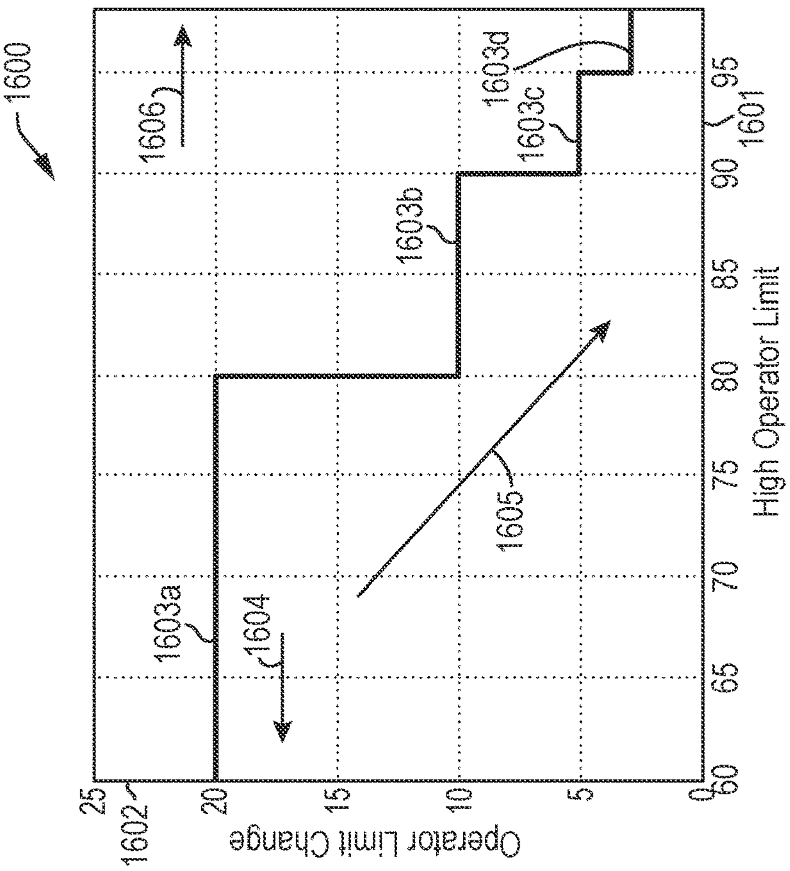
FIGS. 15 and 16 illustrate example monotonic constraint profiles for low and high limits, respectively in an embodiment.
Figure 15:
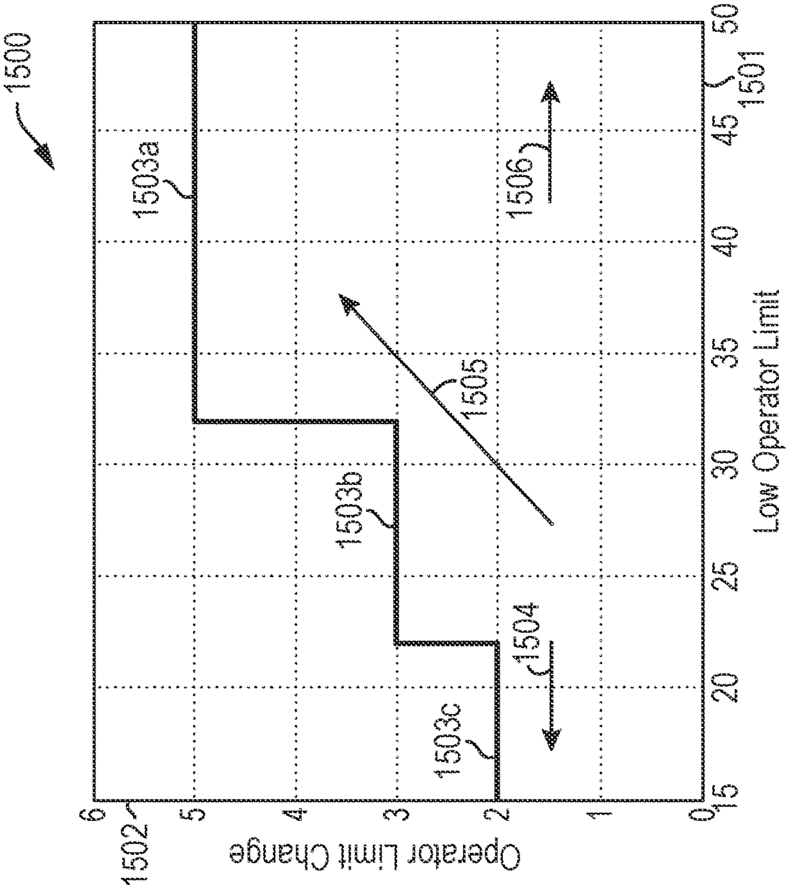

FIGS. 15 and 16 illustrate example monotonic constraint profiles for low 1500 and high 1600 limits, respectively. As shown in the example of FIG. 15, for low limit profile 1500, a restriction that the profile is monotonically increasing 1505 may be imposed to ensure that as a low limit 1501 is decreased towards a true low limit constraint 1504, the profile 1500 provides move sizes 1502 that are increasingly conservative, e.g., as reflected by succession of segments 1503*a*, 1503*b*, and 1503*c*. Moving the low limit 1501 up towards a direction of a high limit 1506 may be less restrictive because an operator is already comfortable with a process variable being between the two limits.

As shown in the example of FIG. 16, a restriction imposed for high limit profile 1600 may be that the profile 1600 is monotonically decreasing 1605. This restriction 1605 may ensure that as the high limit 1601 is increased towards the true high limit constraint 1606, the profile 1600 provides move sizes 1602 that are increasingly conservative, e.g., as reflected by succession of segments 1603*a*, 1603*b*, 1603*c*, and 1603*d*. Again, moving the high limit 1601 down towards the direction of the low limit 1604 may be less restrictive because an operator is already comfortable with the process variable being between the two limits.

Figure 17:
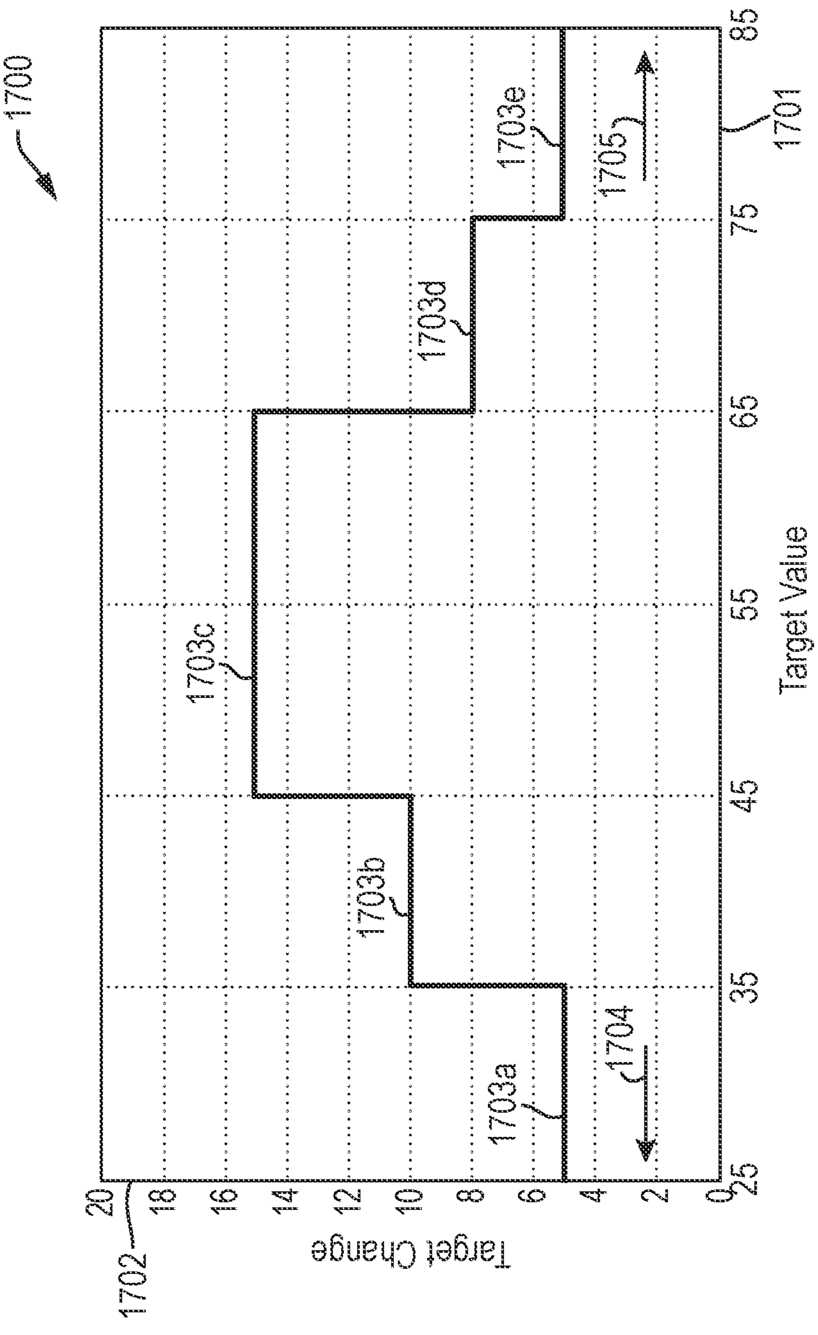
FIG. 17 illustrates a nonlimiting example parabolic constraint profile in an embodiment.

FIG. 17 illustrates an example parabolic constraint profile 1700. As shown in FIG. 17, example profile 1700 includes segments 1703*a*-1703*e*, with each segment indicating a different target change 1702 based on target value 1701. Targets set by an operator may lie between high and low limits. Instead of restricting example profile 1700 to a one-sided monotonic profile that decreases on one side or the other (e.g., as with example profiles 1500 and 1600 of FIGS. 15 and 16, respectively), embodiments may impose a parabolic structure. The profile 1700 may decrease both going toward the low limit 1704 and going toward the high limit 1705, with an operator making the largest moves within an interior region between the limits, e.g., as reflected by segment 1703*c*.

For variable constraints that are not observed changing in history data, embodiments may assume that an operator does not or cannot change a constraint as part of the operator's routine operation of a subject industrial process, e.g., a plant. When embodiments run their simulations, they may automatically remove that constraint from consideration, so they do not run simulations changing it and they do not recommend changing it to the operator.

Behavior of a profile has already been explained for ends of the profile, where embodiments may extrapolate. If values of a limit before and after a change takes place remain within the same segment, then embodiments may recommend a move no larger than a move size for that segment, e.g., 1503*a-c* (FIG. 15), 1603*a-d* (FIG. 16), or 1703*a-e* (FIG. 17). Now behavior where a limit change goes from one segment to a next segment will be described.

Figure 18:
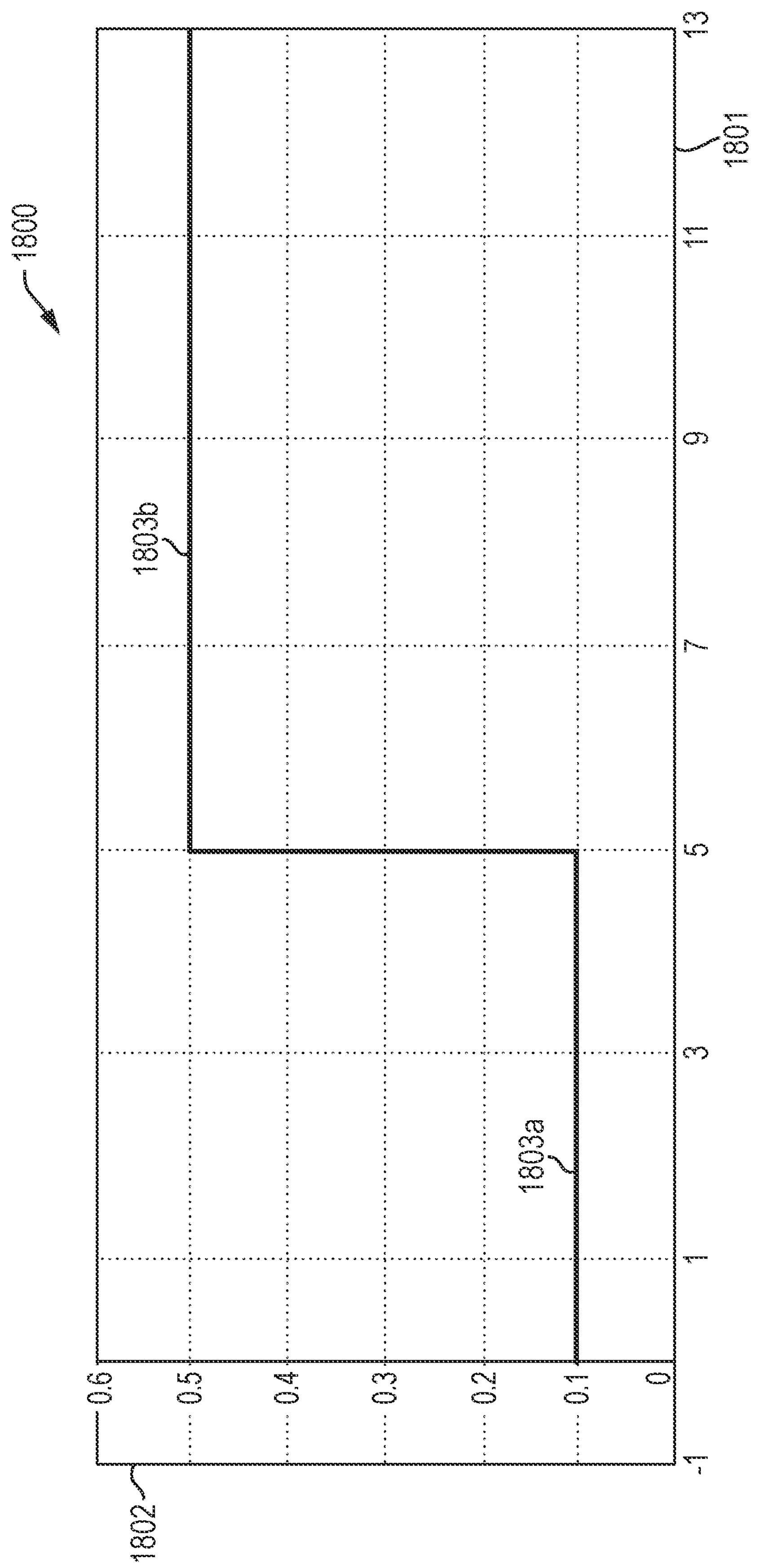
FIG. 18 illustrates a nonlimiting example limit profile in an embodiment.

FIG. 18 illustrates an example limit profile 1800. As shown in FIG. 18, profile 1800 includes two constant segments 1803*a*-1803*b* with different move sizes 1802 based on limit values 1801. Based on example constraint profile 1800, embodiments may assume that an operator may be comfortable changing a limit by 0.1, when a limit value is between 0 and 5, e.g., as reflected by segment 1803*a*, and the operator may be comfortable changing the limit by 0.5, when the limit value is between 5 and 13, e.g., as reflected by segment 1803*b*.

Continuing with FIG. 18, as a nonlimiting example, if a current value is 5, on an edge of the two segments 1803*a* and 1803*b*, and embodiments want to move the limit up, it may move up by 0.5 going to 5.5. As a further nonlimiting example, if instead embodiments want to move the limit down, it may move down by 0.1 going to 4.9.

Referring again to FIG. 18, now consider a nonlimiting example where a current value is 5.2. A hypothetical system may know that an operator is comfortable moving a limit up by 0.5. But if the hypothetical system wants to recommend moving the limit down and move the limit by 0.5, then a new limit may be 4.7. This may create a consistency problem.

With continued reference to FIG. 18, if, as another nonlimiting example, the current value had instead been 5.0 and the hypothetical system moved down by 0.1, the limit may only go to 4.9. By starting at 5.2 in the previous example, the hypothetical system may skip over 4.9 and create a larger move. Additionally, the hypothetical system is moving by 0.3 (from 5.0 to 4.7) through a region, e.g., 1803*a*, where the operator makes moves no larger than 0.1.

Referring yet again to FIG. 18, to handle this behavior when the current value is within less than one operator move (within its current segment, e.g., 1803*a* or 1803*b*) from the next segment that it is moving toward (e.g., the other of 1803*b* or 1803*a*), embodiments may linearly interpolate a value of a move size to ensure consistent move size recommendations. It is noted that embodiments are not limited to linear interpolation, however, and any other suitable technique known to those of skill in the art may also be used.

Figure 19A:
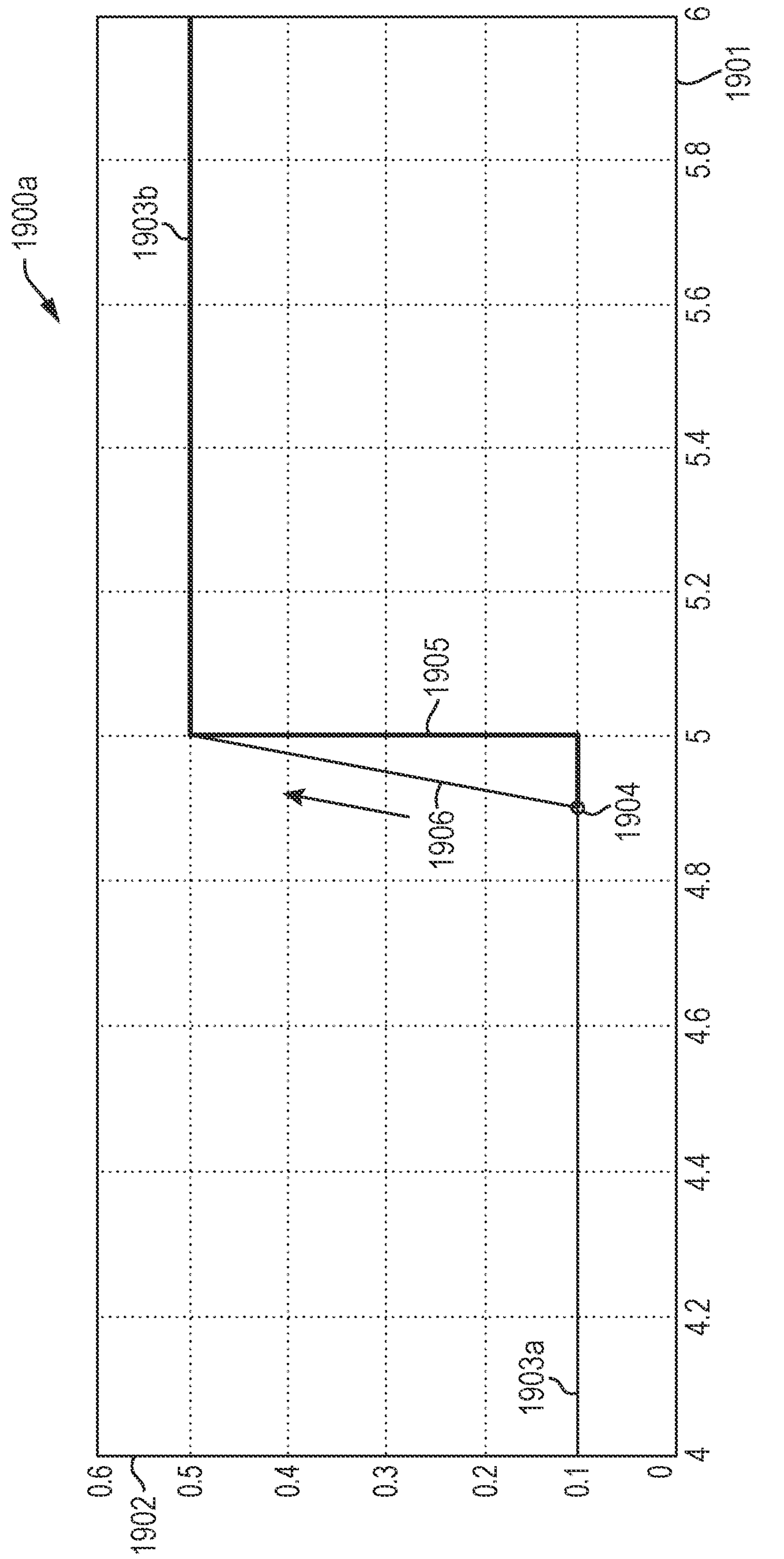
FIGS. 19A-19B illustrate nonlimiting example plots of linear interpolation of the profile of FIG. 18.
Figure 19B:
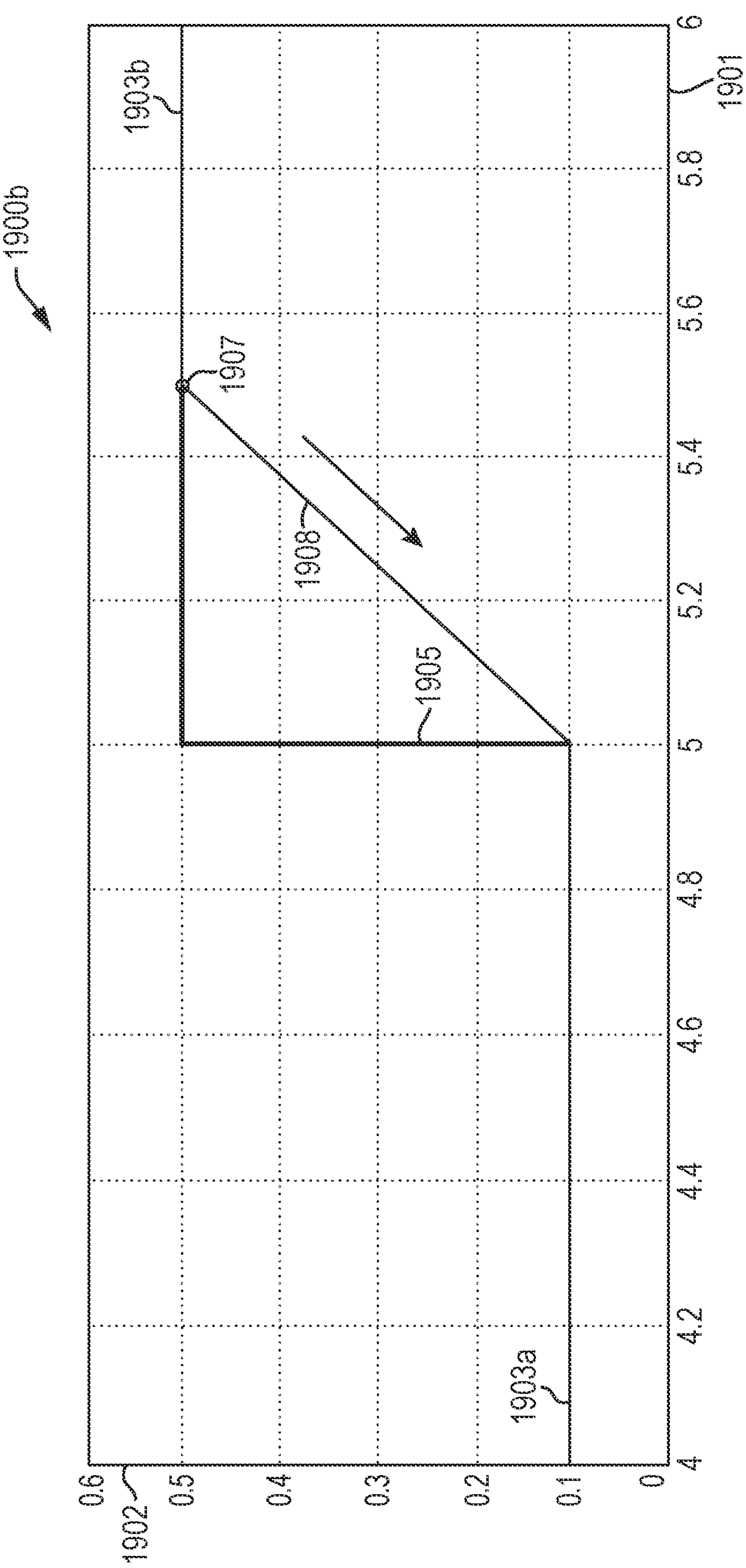

FIGS. 19A and 19B illustrate example plots 1900*a* and 1900*b*, respectively, of linear interpolation of the profile of FIG. 18. As shown in FIG. 19A, the end points of linear interpolation 1906 may be one increment away, e.g., point 1904 (i.e., 4.9), from an edge 1905 of a segment 1903*a* and the edge 1905 of the segment 1903*a*; similarly, as shown in FIG. 19B, the end points of linear interpolation 1908 may be, e.g., point 1907 (i.e., 5.5), and the edge 1905 of segment 1903*b* (i.e., the same edge 1905 as for segment 1903*a*). As with FIG. 18, plots 1900*a* and 1900*b* each have axes for move sizes 1902 based on limit values 1901.

Referring again to FIG. 19A, for a point on x-axis 1901 that falls within linear interpolation region 1906, a move size may be calculated, for example, according to an equation as given below:

$$y = \left(\frac{0.5 - 0.1}{5 - 4.9}\right)(x - 4.9) + 0.1$$

With reference now to FIG. 19B, for a point on x-axis 1901 that falls within linear interpolation region 1908, a move size may be calculated, for example, according to an equation as given below:

$$y = \left(\frac{0.5 - 0.1}{5.5 - 5}\right)(x - 5) + 0.1$$

Continuing with FIG. 19B, in a nonlimiting example where embodiments recommend a move size down from point 5.2 (not shown) on x-axis 1901, embodiments may recommend a move size of 0.26—based on the preceding equation—thus going to 4.94.

For a given value of an operator limit value, moving up or moving down may result in a unique maximum move size that an operator is comfortable making.

Figure 20:
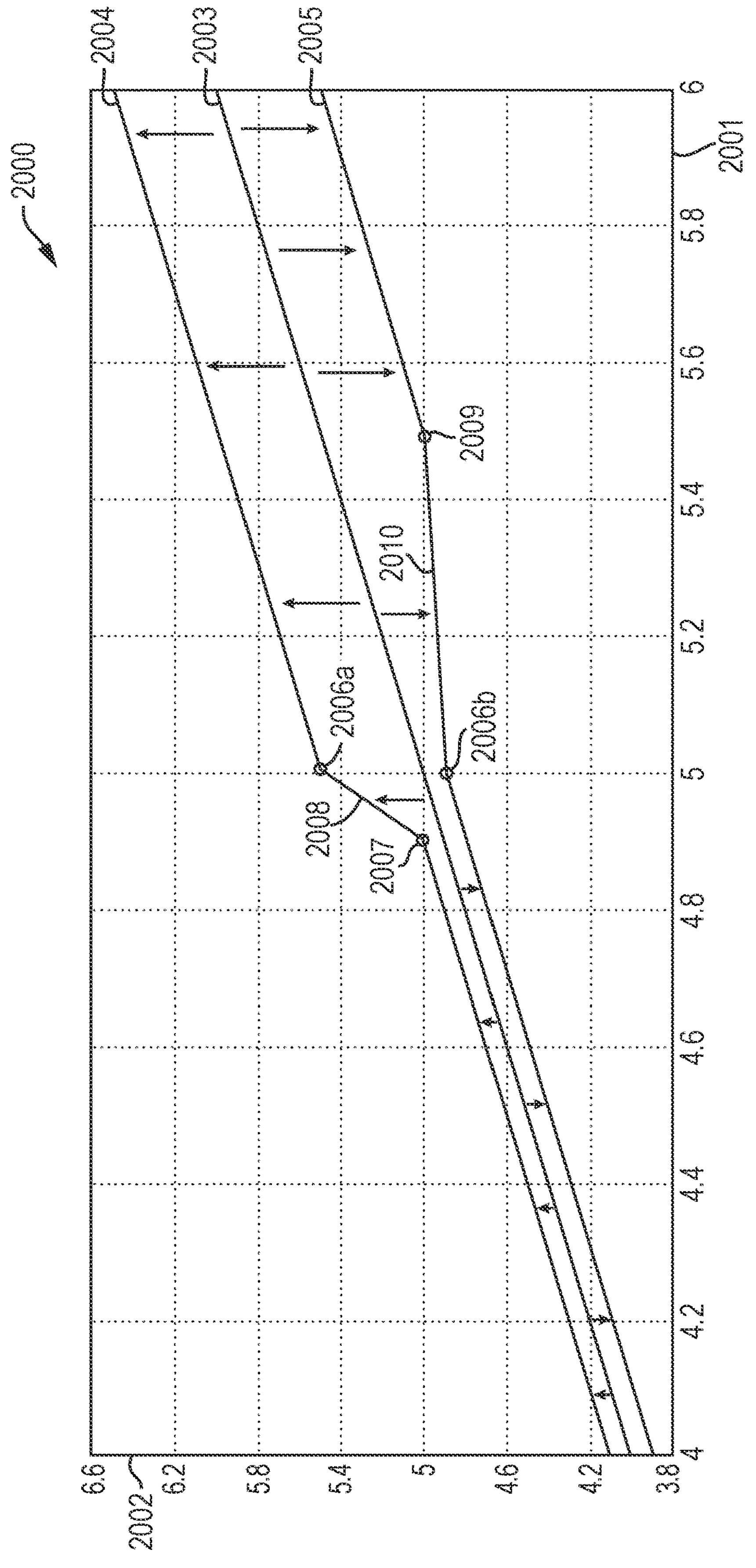
FIG. 20 is a nonlimiting example plot of new limit values determined by the linear interpolation of FIGS. 19A-19B.

FIG. 20 is an example plot 2000 of new limit values determined by the linear interpolation of FIGS. 19A-19B. As shown in FIG. 20, plot 2000 includes initial limit values 2003, plotted on a y 2002=x 2001 line, with new limit values determined by the profile above 2004 and below 2005 initial values 2003, when based on whether the limit is moved up 2004 or down 2005. For lower values of the limit, it can be increased or decreased by 0.1, while for higher values of the limit, it can be increased or decreased by 0.5. The linear interpolation of FIGS. 19A-19B can be seen where slopes of the new limits 2004 and 2005 change. This occurs for the top curve 2004 at region 2009 from point 2007 (4.9) to point 2006*a* (5) on x-axis 2001 and for the bottom curve 2005 at region 2010 from point 2006*b* (5) to point 2009 (5.5).

There may be multiple options that an operator can apply to influence a particular variable within an MPC controller in a desired way. The operator may review each recommendation and make the best decision to influence the process.

If there is no restriction on which constraint to change, engineers and operators may want to change a constraint that produces a best outcome based on certain metric(s). Embodiments may sort recommendations based on specified metric(s) or key performance indicator(s) (KPIs) so operators can review the best (according to metric(s) or KPI(s)) options first. Any suitable known metric(s), KPI(s), and/or combination(s) thereof may be used. To continue, a nonlimiting example metric may be sorting the recommendations based on how much they minimize an economic objective function of a MPC controller compared to a current state. Another nonlimiting example metric may be sorting the recommendations to enable an operator to have the largest effect on a subject industrial process by making an operator sized move for any variable. In other words, embodiments may consider which change to an optimization problem allows an operator to have the most impact on a particular variable. Values based on a specific metric may be displayed with each recommendation to provide operators with additional information that contextualizes it in relation to other recommendations and a current state of a controller. Nonlimiting examples of such values may be seen on a left side of recommendations 552*a-d* (FIGS. 5A-5D), 662 (FIG. 6), 1012*a-d* (FIGS. 10A-10D), and 1102*a-c* (FIGS. 11A-11C), all of which are described hereinabove.

Figure 21:
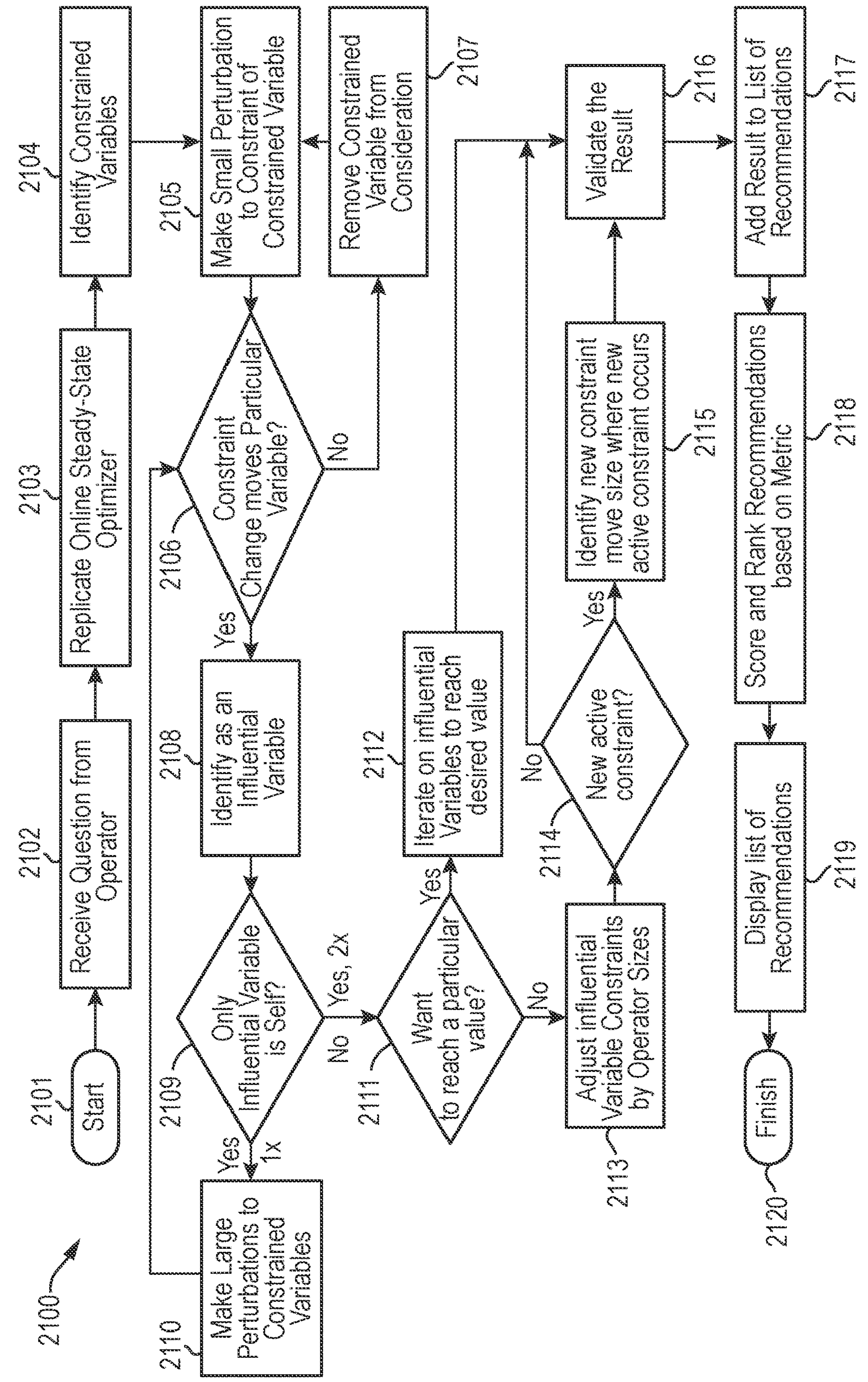
FIG. 21 is a flowchart of another nonlimiting example method for real-time industrial process guidance in an embodiment.

FIG. 21 is a flowchart of another example method 2100 for real-time industrial process guidance embodying the present invention. The method 2100 is a computer-implemented method and, as such, may be implemented using any computing devices or combination of computing devices known to those of skill in the art. The method 2100 starts at step 2101. At step 2102, method 2100 receives a question from an operator, such as via user interface 440 (FIGS. 4A-4C) or 990 (FIG. 9), among other examples. To continue, method 2100 replicates 2103 an online steady-state optimizer and identifies 2104 constrained variables of a subject industrial process. In turn, method 2100 makes relatively small perturbation(s) 2105 to a constraint of a constrained variable and determines 2106 whether the constraint change (s) move the particular variable. If no, then method 2100 removes 2107 the constrained variable from further consideration and returns to step 2105.

Continuing with FIG. 21, if method 2100 determines at step 2106 that the constraint change(s) do move the particular variable, then method 2100 identifies 2108 that variable as an influential variable and determines 2109 whether the particular variable itself is the only influential variable. If yes (such as discussed hereinabove in relation to FIGS. 11A-11C), then method 2100 makes relatively large perturbation(s) 2110 to constrained variable(s) and returns to step (decision juncture) 2106.

If at step 2109 method 2100 either identifies more than one influential variable or twice determines that the particular variable itself is the only influential variable, then at step 2111 method 2100 determines whether the operator wants to reach a specific (or desired) value for a particular process variable (such as discussed hereinabove in relation to FIG. 9). If yes, then method 2100 iterates 2112 on influential variable(s) (e.g., variable(s) identified at steps 2108 and 2109) to reach the desired value and proceeds to step 2116. Else, if no, then at step 2113, method 2100 adjusts influential variable constraint(s) by operator size move(s) (such as discussed hereinabove in relation to FIGS. 12-13, 14A-14B, 15-18, 19A-19B, and 20). To continue, at step 2114, method 2100 determines whether there is a new active constraint. If yes, then at step 2115, method 2100 identifies a new constraint move size where the new active constraint occurs. Else, if no, then at step 2116, method 2100 validates interim result(s).

In turn, method 2100 adds 2117 the result(s) to a list of recommendations, scores and/or ranks 2118 the recommendations based on metric(s), and displays, renders, or otherwise outputs 2119, e.g., to the operator, the list of recommendations, e.g., via interface 550 (FIGS. 5A-5D), 660 (FIG. 6), 1010 (FIGS. 10A-10D), or 1100 (FIGS. 11A-11C). At step 2120, method 2100 concludes.

Figure 22:
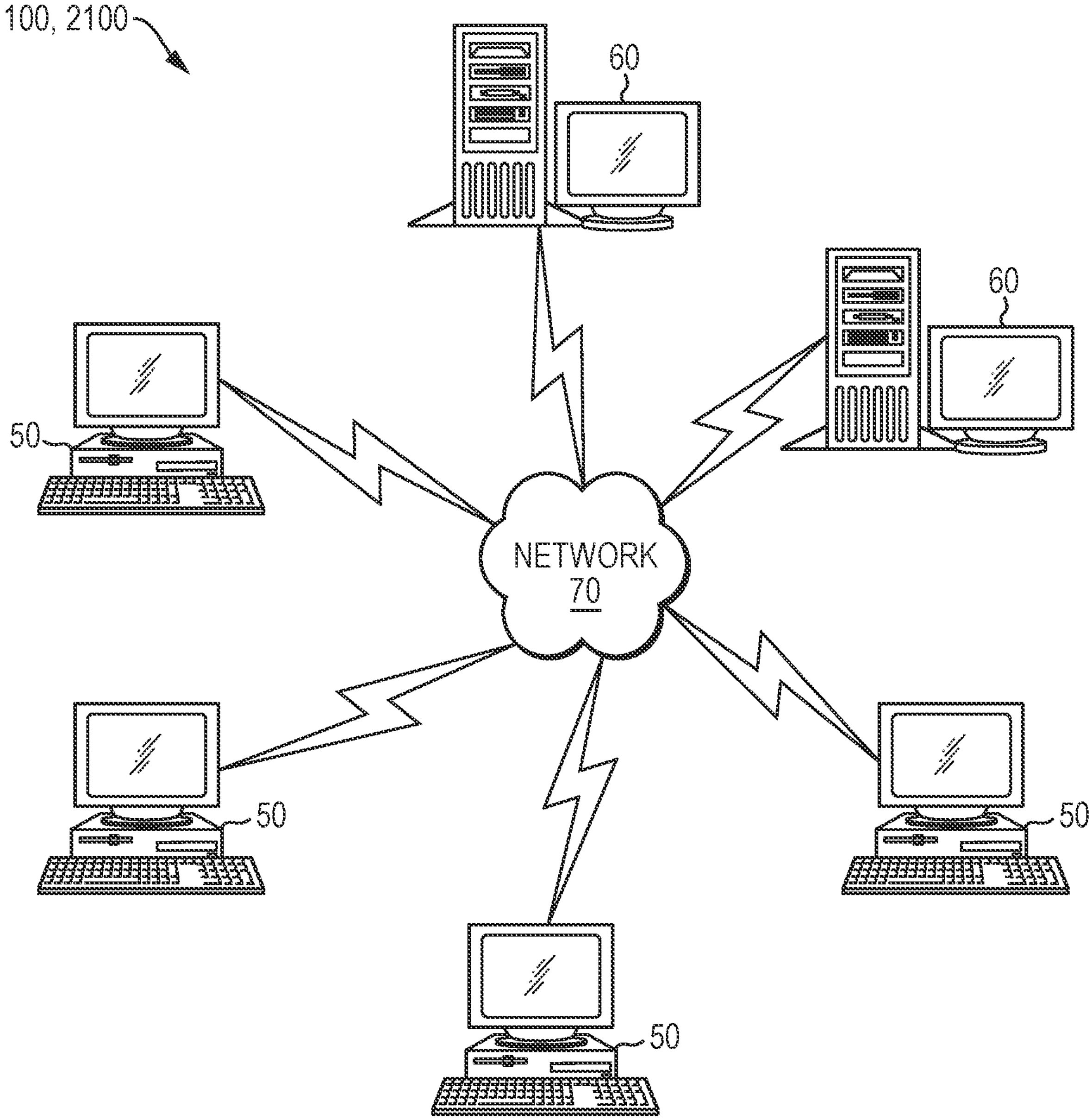
FIG. 22 is a schematic view of a computer network in which embodiments may be implemented.

FIG. 22 is a schematic view of a computer network in which embodiments may be implemented.

Client computer(s)/devices 50 and server computer(s) 60 provide processing, storage, and input/output (I/O) devices executing application programs and the like. Client computer(s)/device(s) 50 can also be linked through communications network 70 to other computing devices, including other client device(s)/processor(s) 50 and server computer (s) 60. Communications network 70 can be part of a remote access network, a global network (e.g., the Internet), cloud computing servers or service, a worldwide collection of computers, local area or wide area networks, and gateways that currently use respective protocols (TCP/IP (Transmission Control Protocol/Internet Protocol), Bluetooth®, etc.) to communicate with one another. Other electronic device/computer network architectures are suitable.

Figure 23:
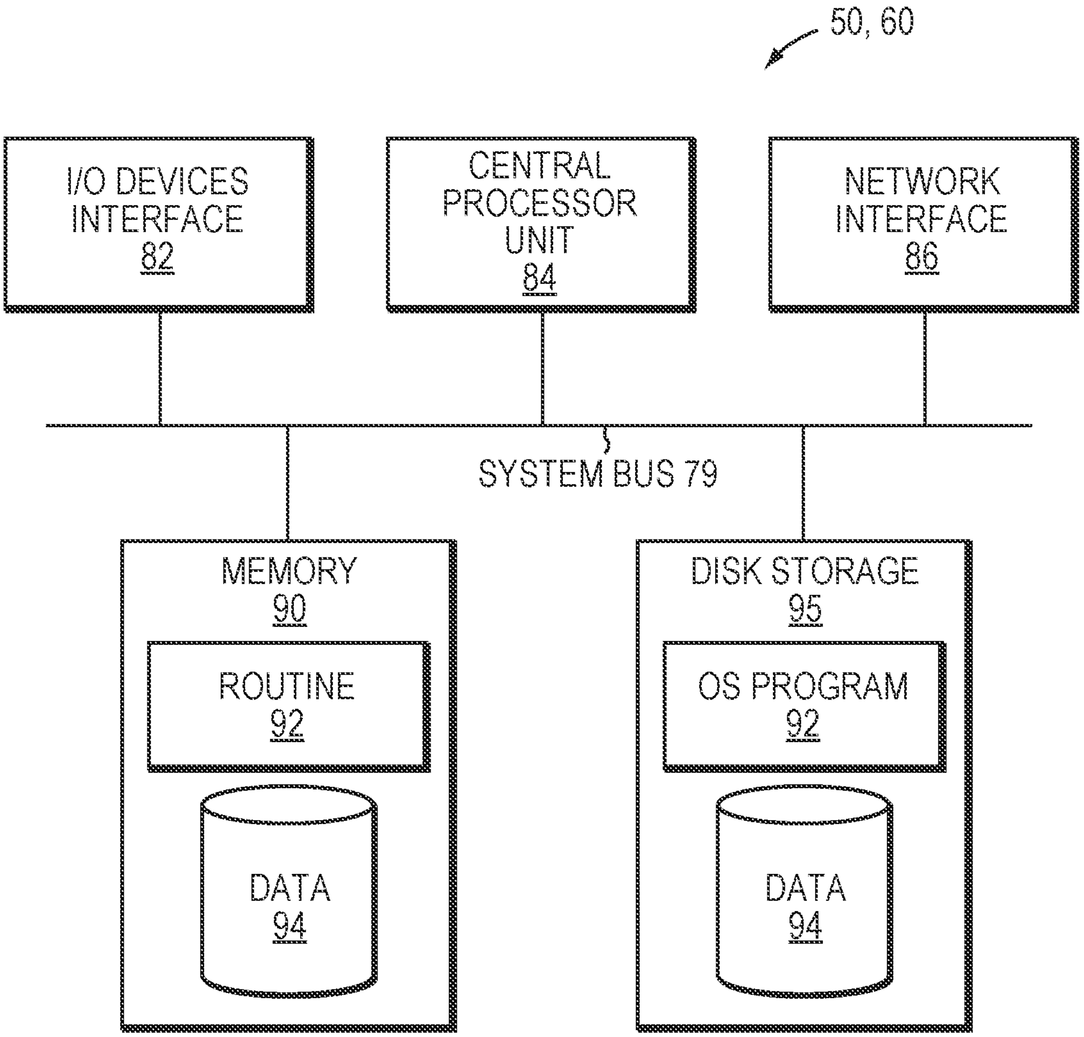
FIG. 23 is a block diagram illustrating an example embodiment of a computer node in the computer network of FIG. 22.

FIG. 23 is a block diagram illustrating an example embodiment of a computer node (e.g., client processor(s)/device(s) 50 or server computer(s) 60) in the computer network of FIG. 22. Each computer node 50, 60 contains system bus 79, where a bus is a set of hardware lines used for data transfer among components of a computer or processing system. Bus 79 is essentially a shared conduit that connects different elements of a computer system (e.g., processor, disk storage, memory, I/O ports, network ports, etc.) that enables transfer of information between the elements. Attached to system bus 79 is I/O device interface 82 for connecting various input and output devices (e.g., keyboard, mouse, display(s), printer(s), speaker(s), etc.) to the computer node 50, 60. Network interface 86 allows the computer node to connect to various other devices attached to a network (e.g., network 70 of FIG. 22). Memory 90 provides volatile storage for computer software instructions 92 and data 94 used to implement an embodiment of the present disclosure (e.g., user-interactive interfaces, functions, operations, and methods 100 and 2100 described and detailed hereinabove). Disk storage 95 provides non-volatile storage for computer software instructions 92 and data 94 used to implement an embodiment of the present disclosure. Central processor unit 84 is also attached to system bus 79 and provides for execution of computer instructions.

In one embodiment, the processor routines 92 and data 94 are a computer program product (generally referenced as 92), including a computer readable medium (e.g., a removable storage medium such as DVD-ROM(s), CD-ROM(s), diskette(s), tape(s), etc.) that provides at least a portion of the software instructions for the disclosure system. Computer program product 92 can be installed by any suitable software installation procedure, as is well known in the art. In another embodiment, at least a portion of the software instructions may also be downloaded over a cable, communication, and/or wireless connection. In other embodiments, the disclosure programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present disclosure routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network (such as network 70 of FIG. 22). In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for real-time industrial process guidance, the method comprising, by a processor:

receiving, in memory of the processor, an operator question, the operator question relating to a user-specified process variable of a model predictive control (MPC) controller of a real-world industrial process;

responsively performing a real-time simulation of one or more operational scenarios of the real-world industrial process using a steady-state optimization problem of the MPC controller to determine operational characteristics of the real-world industrial process in each of the one or more operational scenarios, the processor performing the real-time simulation including, for each operational scenario:

modifying at least one constraint variable of the steady-state optimization problem; and using the modified at least one constraint variable, determining an updated value of the user-specified process variable, wherein the determined operational characteristics of the real-world industrial process include the determined updated value of the user-specified process variable; and generating as output from the processor, at least one recommendation responsive to the operator question, the at least one recommendation being based on the determined operational characteristics of the real-world industrial process, and the output serving as real-time computer generated guidance controlling the real-world industrial process, wherein the real-world industrial process is controlled based on the output.

2. The method of claim 1:

wherein the operator question further relates to increasing or decreasing the user-specified process variable;

wherein the performing the real-time simulation further includes comparing the determined updated value of the user-specified process variable to a current value of the user-specified process variable; and wherein the at least one recommendation includes a recommendation for increasing or decreasing the user-specified process variable.

3. The method of claim 1:

wherein the operator question further relates to a target value for the user-specified process variable;

wherein the performing the real-time simulation further includes comparing the determined updated value of the user-specified process variable to the target value; and wherein the at least one recommendation includes a recommendation for setting the user-specified process variable to the target value.

4. The method of claim 1, wherein the user-specified process variable is (i) a manipulated variable (MV) of the MPC controller or (ii) a controlled variable (CV) of the MPC controller.

5. The method of claim 1, wherein the at least one recommendation includes at least one of: (i) changing a constraint variable for a MV of the MPC controller, (ii) changing a constraint variable for a CV of the MPC controller, (iii) activating a MV of the MPC controller, and (iv) activating a CV of the MPC controller.

6. The method of claim 1, wherein the performing the real-time simulation further includes:

identifying a constraint variable of the at least one constraint variable, the identified constraint variable having an effect on the user-specified process variable.

7. The method of claim 6, wherein the identifying includes:

perturbing a value of a constraint variable of the at least one constraint variable;

responsive to detecting that a value of the user-specified process variable has changed in the steady-state optimization problem based on the perturbing, determining that the constraint variable has an effect on the user-specified process variable; and responsive to detecting that the value of the user-specified process variable has not changed in the steady-state optimization problem based on the perturbing, removing the constraint variable from the real-time simulation of the operational scenario.

8. The method of claim 1, wherein the operator question further relates to increasing or decreasing the user-specified process variable, and wherein the modifying the at least one constraint variable of the steady-state optimization problem includes:

constructing an operator profile based on historical data for the at least one constraint variable; and modifying the at least one constraint variable of the steady-state optimization problem based on the constructed operator profile.

9. The method of claim 8, wherein the constructing the operator profile based on the historical data includes:

constructing the operator profile based on at least one of: (i) an operator high limit for a constraint variable of the at least one constraint variable, (ii) an operator low limit for a constraint variable of the at least one constraint variable, and (iii) an operator target value for a constraint variable of the at least one constraint variable.

10. The method of claim 1, wherein the at least one recommendation includes multiple recommendations, and further comprising:

scoring the multiple recommendations; and ranking, based on the scoring, the multiple recommendations.

11. The method of claim 10, wherein the scoring includes scoring each recommendation of the multiple recommendations based on at least one of: (i) minimizing an objective function of the MPC controller and (ii) an effect on the real-world industrial process of applying the recommendation.

12. The method of claim 1, wherein the performing the real-time simulation further includes:

simulating the one or more operational scenarios of the real-world industrial process based on a real-time execution cycle of the MPC controller.

13. A computer-based system for real-time industrial process guidance, the computer-based system comprising:

a processor; and a memory with computer code instructions stored thereon, the processor and the memory, with the computer code instructions, being configured to cause the computer-based system to:

receive, in the memory, an operator question, the operator question relating to a user-specified process variable of a model predictive control (MPC) controller of a real-world industrial process;

responsively perform a real-time simulation of one or more operational scenarios of the real-world industrial process using a steady-state optimization problem of the MPC controller to determine operational characteristics of the real-world industrial process in each of the one or more operational scenarios, by, for each operational scenario:

modifying at least one constraint variable of the steady-state optimization problem; and using the modified at least one constraint variable, determining an updated value of the user-specified process variable, wherein the determined operational characteristics of the real-world industrial process include the determined updated value of the user-specified process variable; and generate at least one recommendation responsive to the operator question, the at least one recommendation being based on the determined operational characteristics of the real-world industrial process, and serving as real-time computer generated guidance controlling the real-world industrial process, wherein the real-world industrial process is controlled based on the output.

14. The system of claim 13, wherein the user-specified process variable is (i) a manipulated variable (MV) of the MPC controller or (ii) a controlled variable (CV) of the MPC controller.

15. The system of claim 13, wherein the operator question further relates to increasing or decreasing the user-specified process variable, and where, in performing the real-time simulation, the processor and the memory, with the computer code instructions, are further configured to cause the computer-based system to:

compare the determined updated value of the user-specified process variable to a current value of the user-specified process variable, wherein the at least one recommendation includes a recommendation for increasing or decreasing the user-specified process variable.

16. The system of claim 13, where, in performing the real-time simulation, the processor and the memory, with the computer code instructions, are further configured to cause the computer-based system to:

identify a constraint variable of the at least one constraint variable, the identified constraint variable having an effect on the user-specified process variable.

17. The system of claim 16, where, in identifying the constraint variable, the processor and the memory, with the computer code instructions, are further configured to cause the computer-based system to:

perturb a value of a constraint variable of the at least one constraint variable;

responsive to detecting that a value of the user-specified process variable has changed in the steady-state optimization problem based on the perturbing, determine that the constraint variable has an effect on the user-specified process variable; and responsive to detecting that the value of the user-specified process variable has not changed in the steady-state optimization problem based on the perturbing, remove the constraint variable from the real-time simulation of the operational scenario.

18. The system of claim 13, wherein the operator question further relates to increasing or decreasing the user-specified process variable, and where, in modifying the at least one constraint variable, the processor and the memory, with the computer code instructions, are further configured to cause the computer-based system to:

construct an operator profile based on historical data for the at least one constraint variable; and modify the at least one constraint variable of the steady-state optimization problem based on the constructed operator profile.

19. The system of claim 13, wherein the at least one recommendation includes multiple recommendations, and wherein the processor and the memory, with the computer code instructions, are further configured to cause the computer-based system to:

score the multiple recommendations; and rank, based on the scoring, the multiple recommendations.

20. A non-transitory computer program product for real-time industrial process guidance, the non-transitory computer program product comprising a computer-readable medium with computer code instructions stored thereon, the computer code instructions being configured, when executed by a processor, to cause an apparatus associated with the processor to:

receive, in memory, an operator question, the operator question relating to a user-specified process variable of a model predictive control (MPC) controller of areal-world industrial process;

responsively perform a real-time simulation of one or more operational scenarios of the real-world industrial process using a steady-state optimization problem of the MPC controller to determine operational characteristics of the real-world industrial process in each of the one or more operational scenarios, by, for each operational scenario:

modifying at least one constraint variable of the steady-state optimization problem; and using the modified at least one constraint variable, determining an updated value of the user-specified process variable, wherein the determined operational characteristics of the real-world industrial process include the determined updated value of the user-specified process variable; and generate at least one recommendation responsive to the operator question, the at least one recommendation being based on the determined operational characteristics of the real-world industrial process, and serving as real-time computer generated guidance controlling the real-world industrial process, wherein the real-world industrial process is controlled based on the output.

* * * * *